United States Patent
He

(10) Patent No.: US 12,483,703 B2
(45) Date of Patent: Nov. 25, 2025

(54) TILE GROUP PARTITIONING

(71) Applicant: InterDigital VC Holdings, Inc., Wilmington, DE (US)

(72) Inventor: Yong He, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/741,068

(22) Filed: Jun. 12, 2024

(65) Prior Publication Data

US 2024/0333931 A1    Oct. 3, 2024

Related U.S. Application Data

(63) Continuation of application No. 17/311,200, filed as application No. PCT/US2019/064438 on Dec. 4, 2019, now Pat. No. 12,047,571.

(Continued)

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/167* (2014.11); *H04N 19/174* (2014.11)

(58) Field of Classification Search
CPC .. H04N 19/119; H04N 19/105; H04N 19/167; H04N 19/174
See application file for complete search history.

(56) References Cited

U.S. PATENT DOCUMENTS 7,130,467 B1 * 10/2006 Bronder ................. H04N 19/94
                                                              382/218
10,057,570 B2 * 8/2018 Ye ......................... H04N 19/105
(Continued)

FOREIGN PATENT DOCUMENTS

CA    2908007 A1    10/2014
CN    105580373 A    5/2016
(Continued)

OTHER PUBLICATIONS

Jason Blanes translation JP 6666953 May 24, 2018 (Year: 2018).*
(Continued)

*Primary Examiner* — Zaihan Jiang
(74) *Attorney, Agent, or Firm* — Condo Roccia Koptiw LLP

(57) ABSTRACT

A system may identify a defined rectangular picture area and render video corresponding to the defined rectangular picture area. The system may receive a video bitstream comprising a picture having a header and may receive data specifying a structure of the picture. The system may parse the data specifying the structure of the picture for an identifier corresponding to a defined rectangular area in the first picture and for a tile index of a top left tile in the defined rectangular area. The system may determine one or more tiles comprised in the defined rectangular area based on the identifier corresponding to the defined rectangular area and the tile index of the top left tile. The system may reconstruct the picture including a sub-picture that comprises the defined rectangular area based upon the identifier corresponding to the defined rectangular area. The computing system may render the sub-picture in the defined rectangular area.

20 Claims, 18 Drawing Sheets

Related U.S. Application Data

(60) Provisional application No. 62/775,130, filed on Dec. 4, 2018, provisional application No. 62/781,749, filed on Dec. 19, 2018.

(51) Int. Cl.
  *H04N 19/167* (2014.01)
  *H04N 19/174* (2014.01)

(56) References Cited

U.S. PATENT DOCUMENTS

| | | | |
|---|---|---|---|
| 10,154,274 | B2 | 12/2018 | Lainema et al. |
| 10,432,970 | B1 * | 10/2019 | Phillips ............... H04N 19/174 |
| 10,440,416 | B1 * | 10/2019 | Phillips ............... H04N 19/172 |
| 11,172,239 | B2 | 11/2021 | Fang et al. |
| 2003/0005140 | A1 * | 1/2003 | Dekel ..................... G06T 9/007 705/2 |
| 2013/0101035 | A1 * | 4/2013 | Wang ................... H04N 19/174 375/E7.243 |
| 2013/0293544 | A1 * | 11/2013 | Schreyer ............... G06T 15/005 345/426 |
| 2014/0301464 | A1 | 10/2014 | Wu et al. |
| 2019/0387224 | A1 * | 12/2019 | Phillips ................ H04N 19/177 |
| 2019/0387237 | A1 * | 12/2019 | Phillips ............... H04N 21/8456 |

FOREIGN PATENT DOCUMENTS

| | | | |
|---|---|---|---|
| JP | 2014-531178 A | | 11/2014 |
| JP | 2015-533051 A | | 11/2015 |
| JP | 6666953 | * | 5/2018 |
| WO | 2017/172783 A1 | | 10/2017 |
| WO | 2018/128060 A1 | | 7/2018 |
| WO | 2019137313 A1 | | 7/2019 |
| WO | WO-2020008106 A1 * | 1/2020 | ........... H04N 19/597 |
| WO | 2020056247 A1 | | 3/2020 |

OTHER PUBLICATIONS

Brandenburg et al., "Adding Slice Segment Header Length Information to ISOBMFF", Tiledmedia, ISO/IEC JTC1/SC29/WG11 MPEG2018/m43397, Ljubljana, SI, Jul. 2018, 2 pages.

Bross et al., "Versatile Video Coding (Draft 3)", JVET-L1001-V7, Editors, Joint Video Experts Team (JVET) of ITU-T SG 16 WP 3 and ISO/IEC JTC 1/SC 29/WG 11, 12th Meeting: Macao, CN, Oct. 3-12, 2018, 223 pages.

Deshpande, Sachin, "On Tile Information Signalling", JVET-M0416, Sharp Labs of America, Inc., Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Hannuksela et al., "On Slices and Tiles", JVET-L0306-v1, Joint Video Experts Team (JVET) of ITU-T SG 16 WP 3 and ISO/IEC JTC 1/SC 29/WG 11, 12th Meeting: Macao, CN, Oct. 3-12, 2018, 5 pages.

He et al., "AHG12: On Hierarchical Tile Design", JVET-M0123r1, InterDigital Communications, Inc., Joint Video Experts Team (JVET) of ITU-T SG 16 WP 3 and ISO/IEC JTC 1/SC 29/WG11, 13th Meeting: Marrakech, MA, Jan. 9-18, 2019, 8 pages.

He et al., "AHG12: On Rectangular Tile Group", JVET-M0121, InterDigital Communications, Inc., Joint Video Experts Team (JVET) of ITU-T SG 16 WP 3 and ISO/IEC JTC 1/SC 29/WG11, 13th Meeting: Marrakech, MA, Jan. 9-18, 2019, 9 pages.

ISO/IEC, "Information Technology—High Efficiency Coding and Media Delivery in Heterogeneous Environments: Part 2: High Efficiency Video Coding", ISO/IEC JTC1/SC29/WG11 N17661, ISO/IEC DIS 23008-2:201X (4th Edition), Apr. 20, 2018, 874 pages.

ISO/IEC, "WD2 of ISO/IEC 23090-2 OMAF 2nd Edition", Systems, ISO/IEC JTC1/SC29/WG11 N17827v-1, Ljubljana, Slovenia, Jul. 2018, 213 pages.

Lu et al., "CE4: Improvement on Efficiency of High-Level Syntax in Adaptive ROI Conditions", JVT-R043.doc, Institute for Infocomm Research, Joint Video Team (JVT) of ISO/IEC MPEG & ITU-T VCEG (ISO/IEC JTC1/SC29/WG11 and ITU-T SG16 Q.6), 18th Meeting: Bangkok, Thailand, Jan. 14-20, 2006, pp. 1-12.

Wang et al., "On Slicing and Tiling in VVC", JVET-L0114-V1, Huawei Technologies. Co., Ltd., Nokia, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-5.

Wang et al., "On Tile Grouping", JVET-M0130-V1, Huawei Technologies Co., Ltd., Joint Video Experts Team (JVET) of ITU-T SG 16 WP 3 and ISO/IEC JTC 1/SC 29/WG 11, 13th Meeting: Marrakech, MA, Jan. 9-18, 2019, 7 pages.

Wang et al., "Spec Text for the Agreed Starting Point on Slicing and Tiling", JVET-L0686-v2, Huawei Technologies. Co., Ltd, Ericsson, Sharp Labs of America, Inc., Joint Video Experts Team (JVET) of ITU-T SG 16 WP 3 and ISO/IEC JTC 1/SC 29/WG 11, 12th Meeting: Macao, CN, Oct. 3-12, 2018, 1 Page.

Wiegand et al., "Text of ISO/IEC FDIS 14496-10: Information Technology—Coding of Audio-Visual Objects—Part 10: Advanced Video Coding", JVT, Video, ISOIEC FDIS 14496-10:2003(E), ISO/IECJTC 1/SC 29/WG 11 N5555, Mar. 31, 2003, 269 pages.

ISO/IEC, 23008-2 "Information technology—High efficiency coding and media delivery in heterogeneous environments—Part 2: High efficiency video coding, Amendment 3: Additional supplemental enhancement information", Jul. 2018, 15 pages.

Bross, Benjamin et al., "Versatile Video Coding (Draft 2)", Joint Video Experts Team (JVET) of ITU-T SG 16 WP 3 and ISO/IEC JTC 1/SC 29/WG 11, JVET-K1001-v5, Jul. 10-18, 2018, 130 pages.

* cited by examiner

TILE GROUP PARTITIONING

CROSS-REFERENCE TO RELATED APPLICATIONS

This application is a continuation application of U.S. Non-Provisional application Ser. No. 17/311,200 filed Jun. 4, 2021, which is the National Stage Entry under 35 U.S.C. § 371 of Patent Cooperation Treaty Application No. PCT/US2019/064438, filed Dec. 4, 2019, which claims the benefit of U.S. Provisional Application No. 62/781,749, filed Dec. 19, 2018, and titled Tile Group Partitioning, and of U.S. Provisional Application No. 62/775,130, filed Dec. 4, 2018, and titled Tile Group Partitioning, the contents of all of which are hereby incorporated herein by reference in their entireties.

BACKGROUND

In video data compression, a structure may be defined that facilitates referencing and processing portions of a picture. For example, picture pixels that cover a portion of a picture may be grouped into units referred to as coding tree units (CTUs). Larger portions of the picture may be referred to as tiles which may be defined based upon CTUs. A plurality of tiles may be referred to and referenced together as a tile group. The defined structure allows for portions of pictures in video streams to be particularly referenced for purposes of storing and communicating video.

SUMMARY

Systems and implementations are described herein for defining a rectangular picture area in a video data stream and rendering corresponding pictures. A computing system which may be, for example, a wireless transmit and receive unit (WTRU) may be programmed to receive a video bitstream comprising a picture having a picture header. The received video bitstream may be, for example, Versatile Video Coding (VVC) formatted data. The computing system may identify, based on a picture parameter set identifier in the picture header, a picture parameter set (PPS) that comprises data specifying a structure of the picture.

The computing system may determine, based on data specifying the structure of the picture, an identifier corresponding to a defined rectangular area in the picture and a tile index of a top left tile in the defined rectangular area. For example, the computing system may parse the data specifying the structure of the picture for the identifier corresponding to the defined rectangular area and for the tile index of the top left tile. The computing system may determine one or more tiles comprised in the defined rectangular area based upon the identifier corresponding to the defined rectangular area and the tile index of the top left tile in the defined rectangular area.

The computing system may reconstruct the picture including a sub-picture that comprises the defined rectangular area based on the identifier corresponding to the defined rectangular area. The computing system may render the sub-picture in the defined rectangular area.

The computing system may parse the picture header to identify an identifier associated with the sub-picture. The computing system may then identify a sub-bitstream associated with the sub-picture based upon the identifier corresponding to the defined rectangular area matching the identifier associated with the sub-picture. The computing system may then reconstruct the sub-picture based on the sub-bitstream.

A motion-constrained tile set (MCTS) may allow a tile set to be decoded (e.g., decoded independently) from other tiles excluded in the set. The computing system may identify, based upon the received data and the identifier corresponding to the defined rectangular area, an indication the defined rectangular area is associated with a motion constrained tile set.

This Summary is provided to introduce a selection of concepts in a simplified form that are further described herein in the Detailed Description. This Summary is not intended to limit the scope of the claimed subject matter. Other features are described herein.

BRIEF DESCRIPTION OF THE DRAWINGS

A more detailed understanding may be had from the following description, given by way of example in conjunction with the accompanying drawings wherein:

FIGS. 10A, 10B, and 10C illustrate example CTB scanning implementations.

FIGS. 12A, 12B, and 12C illustrate examples of CTB raster and tile group scanning.

DETAILED DESCRIPTION

Techniques are described for identifying a defined rectangular picture area in a video stream and rendering video corresponding to the defined rectangular picture area. A system may be programmed to receive a video bitstream comprising a picture having a header. The system may also receive data specifying a structure of the picture. The system may parse the data specifying the structure of the picture for an identifier corresponding to a defined rectangular area in the first picture and for a tile index of a top left tile in the defined rectangular area. The system may determine one or more tiles comprised in the defined rectangular area based on the identifier corresponding to the defined rectangular area and the tile index of the top left tile in the defined rectangular area. The system may reconstruct the picture including a sub-picture that comprises the defined rectangular area based upon the identifier corresponding to the defined rectangular area. The computing system may render the sub-picture in the defined rectangular area.

A picture may be partitioned into one or more tile columns and rows. Tile syntax and/or decoding processing may eliminate one or more picture prediction dependencies and/or entropy decoding dependencies across tile boundaries within the same picture. The tile syntax and/or decoding process may allow for the tiles to have an independent relationship relative to other tiles within the reference pictures for inter-picture prediction. If more than one tile is included in a slice, an entry point byte offset for a (e.g., each) tile other than the first tile in the slice may be signaled in a slice header.

Figure 1:
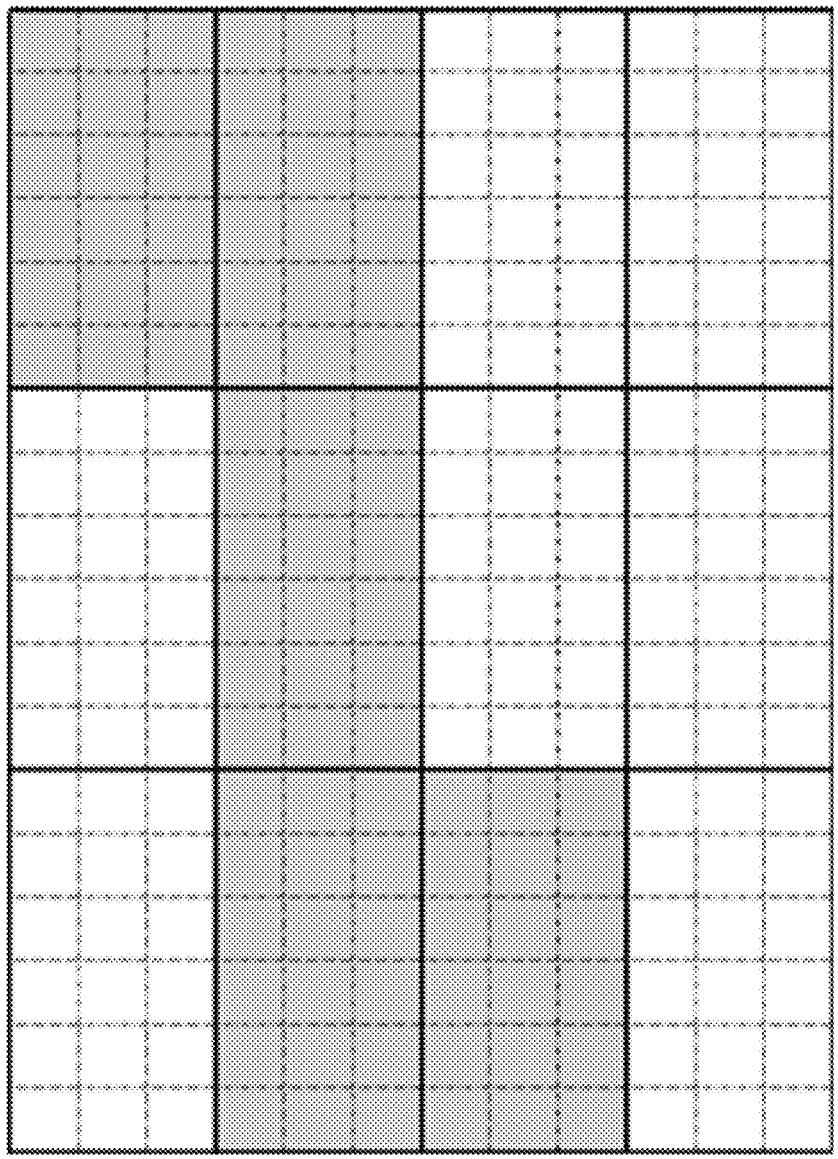
FIG. 1 illustrates an example of picture partitioning.

A tile group may be or may include a slice. A tile group may be or may include a string of tiles, e.g., starting in raster order. A tile group header may indicate a number of tiles in the tile group and/or entry points to the start of a (e.g., each) tile. FIG. 1 illustrates an example of picture partitioning. As shown in FIG. 1, a picture with 18×12 coding tree units (CTUs), e.g., luma CTUs, may be partitioned into 12 tiles and 3 tile groups.

An example syntax for a picture tile grid may be as illustrated in Table 1. Table 1 illustrates an example picture parameter set syntax. The picture tile grid illustrated in Table 1 may be specified by tile columns and tile rows.

TABLE 1

Example picture parameter set syntax

|  | Descriptor |
|---|---|
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { |  |
|     num_tile_columns_minus1 | ue(v) |
|     num_tile_rows_minus1 | ue(v) |
|     uniform_tile_spacing_flag | u(1) |
|     if( !uniform_tile_spacing_flag ) { |  |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|     loop_filter_across_tiles_enabled_flag | u(1) |
|   } |  |
|   rbsp_trailing_bits( ) |  |
| } |  |

Table 2 illustrates an example tile group header syntax. A syntax element tile_group_address may specify the index of the first tile in the tile group if there is more than one tile in the picture. A syntax element num_tiles_in_tile_group_minus1 plus 1 may specify the number of tiles in the tile group. A syntax element entry_point_offset_minus1[i] plus 1 may specify the i-th tile entry point offset in bytes.

The first byte and last byte of k-th tile within the tile group data that follow the tile group header may be derived by using equation (1) and/or equation (2):

$$firstByte[k] = \sum_{n=1}^{k}(entry\_point\_offset\_minus1[n - 1] + 1) \quad (1)$$

$$lastByte[k] = firstByte[k] + entry\_point\_offset\_minus1[k] \quad (2)$$

TABLE 2

Example tile group header syntax

|  | Descriptor |
|---|---|
| tile_group_header( ) { |  |
|   tile_group_pic_parameter_set_id | ue(v) |
|   if( NumTilesInPic > 1 ) { |  |
|     tile_group_address | u(v) |
|     num_tiles_in_tile_group_minus1 | ue(v) |
|   } |  |
|   .... | ue(v) |
|   if( num_tiles_in_tile_group_minus1 > 0 ) { |  |
|     offset_len_minus1 | ue(v) |
|     for( i = 0; i < num_tiles_in_tile_group_minus1; i++ ) |  |
|       entry_point_offset_minus1[ i ] | u(v) |
|   } |  |
|   .... |  |
| } |  |

A set of tiles covering a picture region may be coded as a motion-constrained tile set (MCTS). Motion vectors may be restricted for MCTS. For example, motion vectors may be restricted for MCTS, and a decoder may decode a subset of a bitstream including MCTS, e.g., instead of and/or in addition to decoding one or more (e.g., all) the bits for an entire picture. One or more (e.g., three) MCTS related supplemental enhancement information (SEI) messages may include a temporal MCTSs SEI message, an MCTSs extraction information set SEI message, and an MCTSs extraction information nesting SEI message. The SEI messages may indicate the MCTS position and/or properties and may enable extraction of a subset of motion-constrained tiles (MCTs) from a bitstream. The SEI messages may indicate reposition of the subset of the MCTs to another bitstream.

Figure 2:
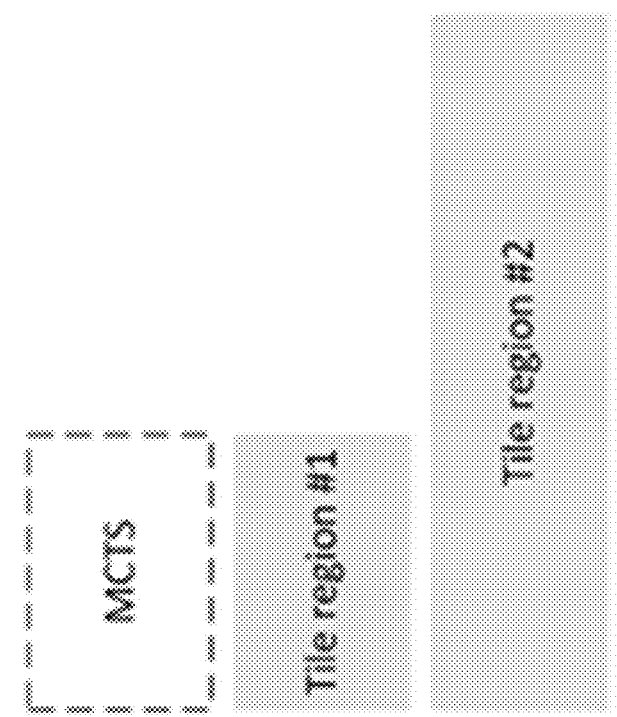
FIG. 2 illustrates an example of a motion-constrained tile set (MCTS).
Figure 2:
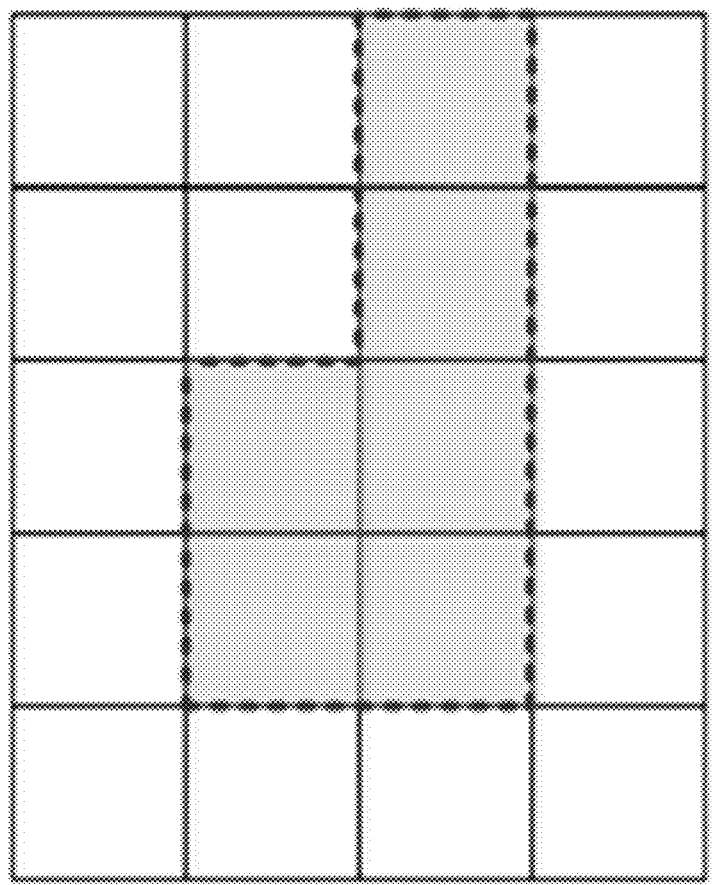

Table 3 illustrates an example temporal MCTSs SEI message. For example, a syntax element mcts_id[i] may specify the identifying number of i-th MCTS. A syntax element top_left_tile_idx[i][j] and a syntax element bottom_right_tile_idx[i][j] from Table 3 may specify the tile position of the top-left tile and the tile position of the bottom-right tile of the j-th rectangular region of tiles in an i-th MCTS, respectively. An MCTS may have a non-rectangular shape. FIG. 2 illustrates an example MCTS. As illustrated in FIG. 2, an MCTS may include a number of rectangular tiles regions, e.g., tile region 1 and tile region 2, that together give the MCTS an non-rectangular shape.

TABLE 3

Example temporal motion constrained tile sets SEI message

|  | Descriptor |
|---|---|
| temporal_motion_constrained_tile_sets( payloadSize ) { |  |
|   mc_all_tiles_exact_sample_value_match_flag | u(1) |
|   each_tile_one_tile_set_flag | u(1) |
|   if( !each_tile_one_tile_set_flag ) { |  |

TABLE 3-continued

Example temporal motion constrained tile sets SEI message

| | Descriptor |
|---|---|
| limited_tile_set_display_flag | u(1) |
| num_sets_in_message_minus1 | ue(v) |
| for( i = 0; i <= num_sets_in_message_minus1; i++ ) { | |
|   mcts_id[ i ] | ue(v) |
|   .... | |
|   num_tile_rects_in_set_minus1[ i ] | ue(v) |
|   for( j = 0; j <= num_tile_rects_in_set_minus1[ i ]; j++ ) { | |
|     top_left_tile_idx[ i ][ j ] | ue(v) |
|     bottom_right_tile_idx[ i ][ j ] | ue(v) |
|   } | |
| .... | |
| } | |

The MCTSs extraction information set SEI message may provide information (e.g., supplemental information) for MCTS sub-bitstream extraction. For example, the MCTS extraction information set SEI message may generate a conforming bitstream for an MCTS. The information may include a number of extraction information sets (e.g., num_info_sets_minus1), a number of MCTS sets (e.g., num_mcts_sets_minus1[i]), and/or replacement video parameter sets (VPSs), sequence parameter sets (SPSs), and picture parameter sets (PPSs) to be used, e.g., during the MCTS sub-bitstream extraction process. A syntax element output_slice_segment_address may specify the output slice segment address of the j-th slice segment. The value of the output_slice_segment_address syntax element may be in the range of 0 to PicSizeInCtbsY−1, inclusive. MCTS may be used in region-of-interest and/or viewport dependent omnidirectional video processing.

Omnidirectional video processing may be viewport dependent. Omnidirectional media format (OMAF) may define a media format and may enable an omnidirectional media, such as 360-degree video, image, audio, and/or associated timed text.

Figure 3:
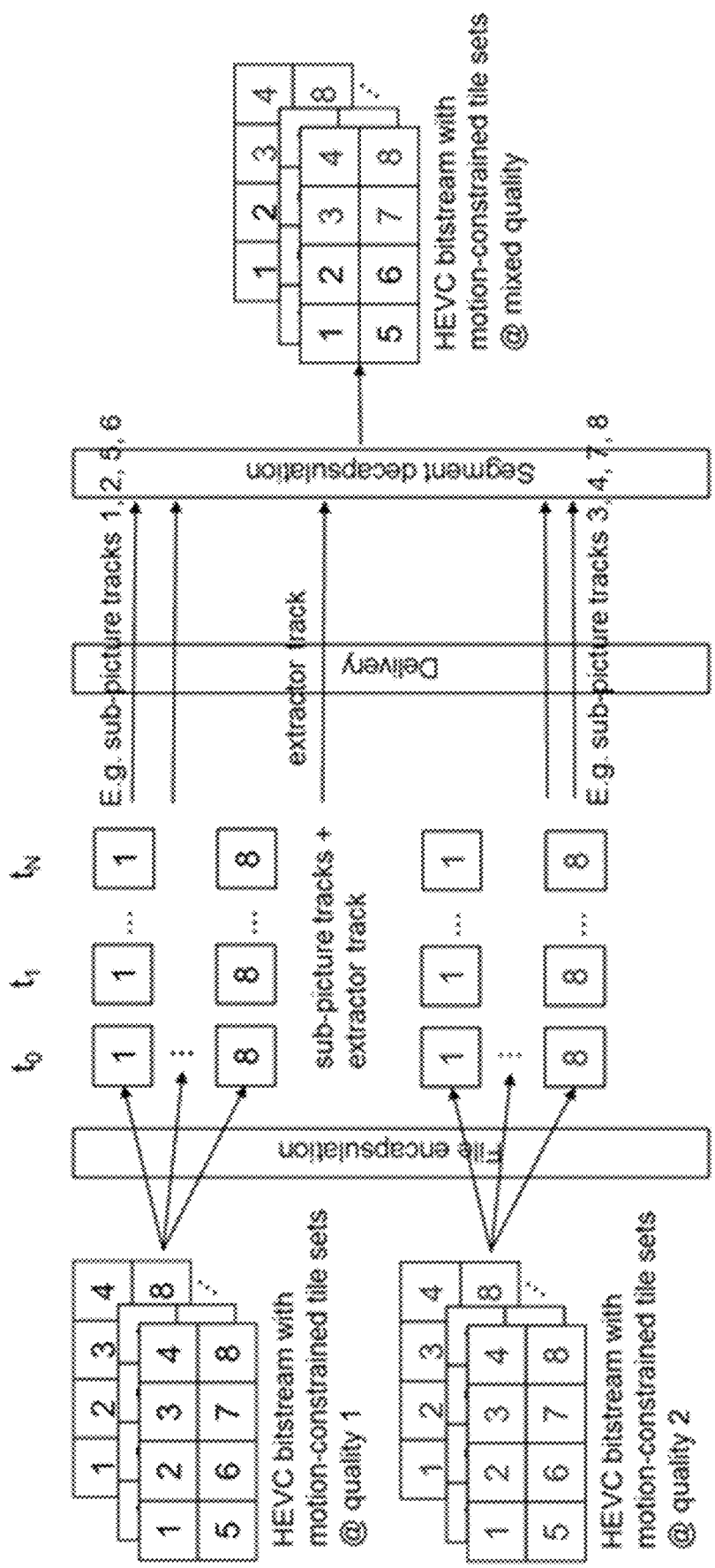
FIG. 3 illustrates an example merging of MCTS-based region tracks.

An equal-resolution MCTS-based viewport-dependent scheme may code the same omnidirectional video content into one or more bitstreams (e.g., HEVC bitstreams) at different picture qualities and/or bitrates. A (e.g., each) MCTS may be included in a region track, and an extractor track may be created. The OMAF player may choose the quality at which a (e.g., each) sub-picture track is received, e.g., based on the viewing orientation. FIG. 3 illustrates an example merging of MCTS-based region tracks (e.g., HEVC MCTS-based region tracks) of the same resolution. For example, as shown in FIG. 3, an OMAF player may receive MCTS tracks 1, 2, 5, and 6 at a particular quality (e.g., quality 1) and may receive region tracks 3, 4, 7, and 8 at another quality (e.g., quality 2). The extractor track may be used to reconstruct a bitstream that may be decoded with a decoder (e.g., an HEVC decoder). The tiles of the reconstructed bitstream (e.g., HEVC bitstream) with MCTS at different quality may be signaled by a tile syntax (e.g., HEVC tile syntax).

MCTS-based viewport-dependent video processing may code the same omnidirectional video source content into one or more (e.g., multiple) spatial resolutions. Based on the viewing orientation, an extractor may select the tiles matching the viewing orientation. For example, the extractor may select the tiles matching the viewing orientation in high resolution and other tiles in low resolution. The bitstream resolved from the extractor tracks may be decoded by a (e.g., a single) decoder.

Figure 4:
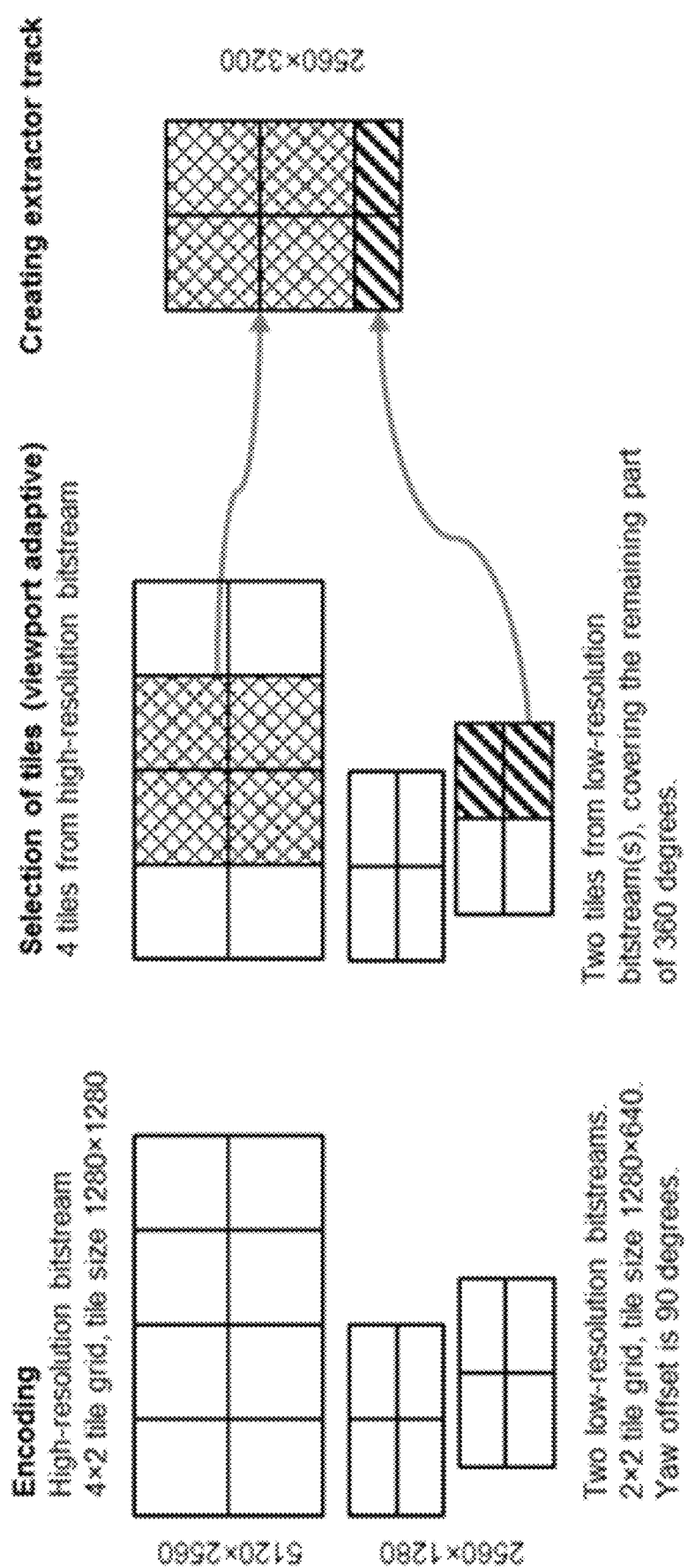
FIG. 4 illustrates an example of extractor track combining MCTSs from bitstreams of different resolutions.

FIG. 4 illustrates an example of an extractor track combining MCTSs from bitstreams of different resolutions. For example, FIG. 4 shows a scheme for achieving a 5K effective equirectangular projection (ERP) resolution with a viewport-dependent video profile. The content may be coded at two spatial resolutions, such as, for example, 5120×2560 and 2560×1280, and with 4×2 and 2×2 tile grid, respectively. An MCTS may be coded for a (e.g., each) tile position. Two different sets of the low-resolution content may be coded and may be differentiated by 90-degree yaw difference in rotation angles. Four MCTSs of the high-resolution bitstream and two MCTSs of low-resolution bitstream may be selected to form a viewport adaptive extractor track.

Figure 5:
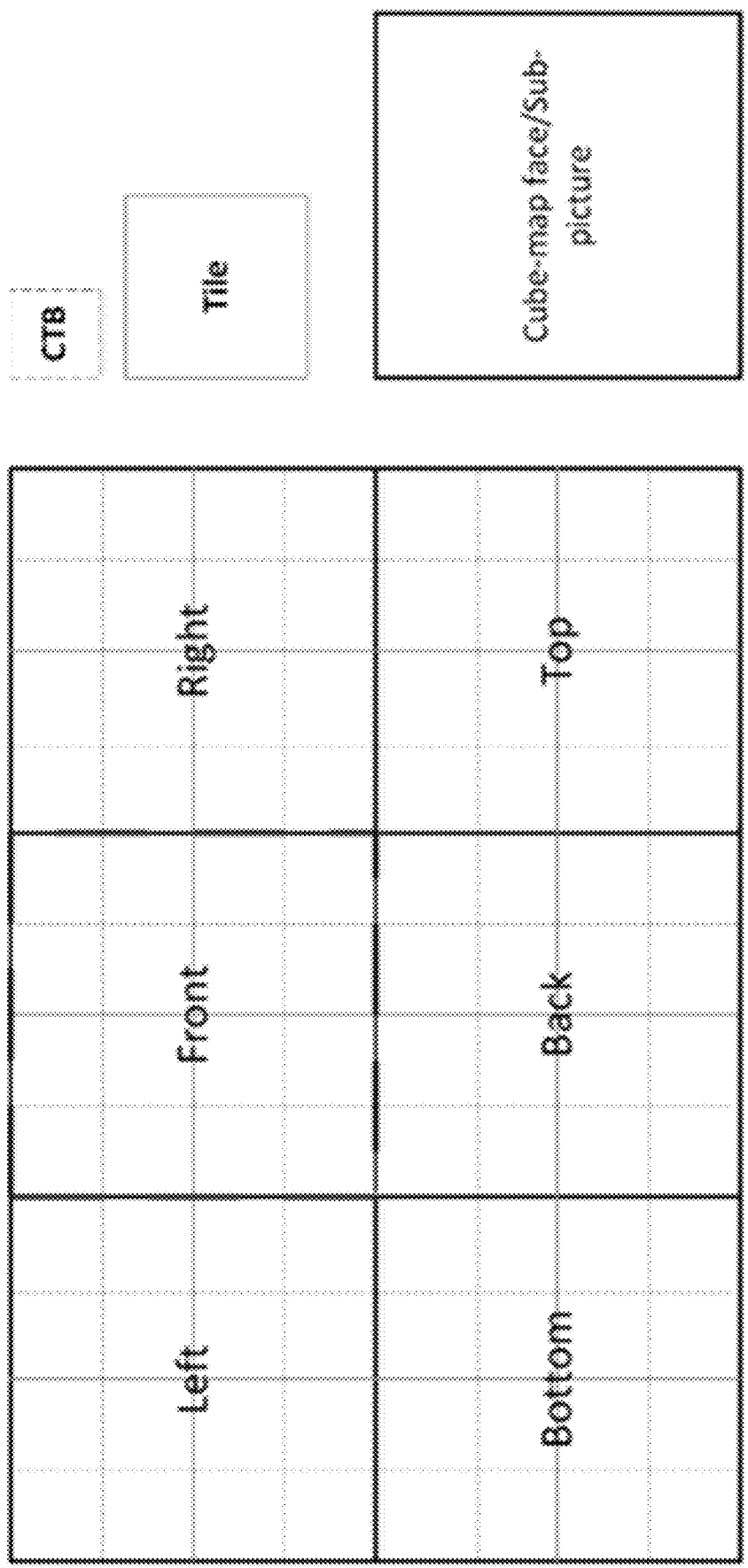
FIG. 5 illustrates an example cube mapping frame.

A picture partitioning structure may be provided. For example, the picture partitioning structure may address one or more emerging video applications, such as 360-degree video. A tile group described herein may replace a slice structure and/or may enable a transcoding operation (e.g., a simple transcoding operation). For example, a region of interest (ROI) may be decoded (e.g., decoded independently), or a sub-picture from a coded video sequence that has a large picture size may be extracted and the result converted into a coded video sequence. The result may be converted into the coded video sequence for a smaller picture size, e.g., by modifying high-level syntax and/or fully decoding and re-coding the low-level data (e.g., the data at the CTU level and below). A tile group may form an arbitrary shape of region that may be flexible but may not support sub-picture based partitioning. A rectangular tile group may support region based video applications. For example, a rectangular tile group may apply to a particular region and/or face in omnidirectional video that is in equirectangular, cub-map projection format, and/or the like. FIG. 5 illustrates an example cube mapping frame. As shown in FIG. 5, an example cube mapping frame may be a 3×2 cube-map picture. A rectangular tile group may be applied to a face or sub-picture for independent decoding and rendering and/or sub-bitstream extraction to form an extractor track.

Systems and implementations are described herein for defining a rectangular picture area in a video data stream and rendering corresponding pictures. A computing system which may be, for example, a wireless transmit and receive unit (WTRU) may be programmed to receive a video bitstream comprising a picture having a picture header. The received video bitstream may be, for example, Versatile Video Coding (VVC) formatted data. The computing system may identify, based on a picture parameter set identifier in the picture header, a picture parameter set (PPS) that comprises data specifying a structure of the picture.

The computing system may determine, based on data specifying the structure of the picture, an identifier corresponding to a defined rectangular area in the picture and a tile index of a top left tile in the defined rectangular area. For example, the computing system may parse the data specifying the structure of the picture for the identifier corresponding to the defined rectangular area and for the tile index of the top left tile. The computing system may determine one or more tiles comprised in the defined rectangular area based upon the identifier corresponding to the defined rectangular area and the tile index of the top left tile in the defined rectangular area.

The computing system may reconstruct the picture including a sub-picture that comprises the defined rectangular area based on the identifier corresponding to the defined rectangular area. The computing system may render the sub-picture in the defined rectangular area.

A rectangular tile group structure may be used to enable region of interest and/or sub-picture based video application. Bottom-to-top tile group partitioning and top-to-bottom tile group partitioning may be used. MCTS may be enabled for a tile group to support ROI and/or sub-picture extraction and repositioning.

Bottom-to-top tile group partitioning may divide a picture into a tile and may group one or more (e.g., multiple) tiles into a tile group. Top-to-bottom tile group partitioning may divide a picture into one or more tile groups and divide the one or more tile groups into one or more tiles. A rectangular tile group syntax structure may be established using one or more syntax elements of the tile group. Syntax elements of the tile group, may include tile_group_id, tile_group_start_address, tile_group_end_address, num_tiles_in_tile_group_minus1, and/or the like. Syntax elements may be signaled at various levels. For example, the syntax elements of the tile group may be signaled in a parameter set (e.g., such as a picture parameter set (PPS), a sequence parameter set (SPS), a video parameter set (VPS), and/or the like) or in a picture header. A skilled person in the art will realize that one or more parameters being carried in a parameter set described herein may include, but not limited to, PPS, SPS, VPS, and/or the like parameter set.

Bottom-to-top tile group partitioning may be employed to provide rectangular tile group structure. A tile group may be a sequence of tiles in tile raster scan of a picture. A tile may be a sequence of CTUs that covers a region of a picture (e.g., a rectangular region of a picture). A tile group may be a set of tiles covering a picture region (e.g., a rectangular picture region). In examples, the boundary of tile groups may span across the picture. In examples, the boundary of tile groups may be within the picture (e.g., not spanning across the picture). The bottom-to-top tile group partitioning may divide a picture into a tile and may group one or more (e.g., multiple) tiles into a tile group.

Syntax and semantics for rectangular tile groups may be provided. Table 4 illustrates an example tile group header syntax that may be used for rectangular tile groups.

TABLE 4

Example tile group header syntax

| | Descriptor |
|---|---|
| tile_group_header( ) { | |
|   tile_group_pic_parameter_set_id | ue(v) |
|   tile_group_id | ue(v) |
|   num_tiles_in_tile_group_minus1 | ue(v) |
|   if( NumTilesInPic > 1 && NumTilesInPic > | |
|   (num_tiles_in_tile_group_minus1 +1)) | |
|   { | |
|     tile_group_start_address | u(v) |
|     if (num_tiles_in_tile_group_minus1 !=0) | |
|       tile_group_end_address | u(v) |
|   } | |
|   .... | ue(v) |
| } | |

A syntax element tile_group_id may specify an identifying number of the associated tile group. The value of tile_group_id syntax element may be in the range of 0 to $2^{32}-2$, inclusive. The profile and/or level may specify the maximum number of the tile group.

A syntax element tile_group_start_address and a syntax element tile_group_end_address may specify the position of the first tile (e.g., or top left tile), and the position of the last tile (e.g., or bottom-right tile) in a rectangular region of the associated tile group. The address value may be an address of an associated tile, e.g., in tile raster scan of a picture.

Signaling of the tile group start address may be skipped if a picture includes a tile (e.g., a single tile), or a picture includes a tile group (e.g., a single tile group). Signaling of the tile group end address may be skipped if a tile group includes a single tile. If the tile group start address and/or the tile group end address are absent, the value of the tile_group_start_address syntax element may be inferred (e.g., equal to 0), and the value of the tile_group_end_address syntax element may be inferred (e.g., to equal to the value of tile_group_start_address syntax element).

Figure 6:
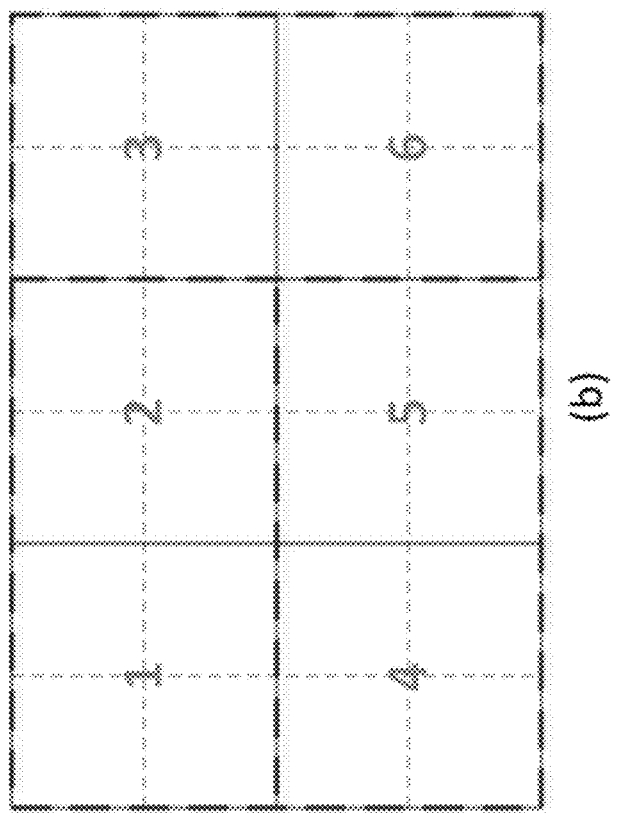
FIG. 6 illustrates an example tile group partitioning.
Figure 6:
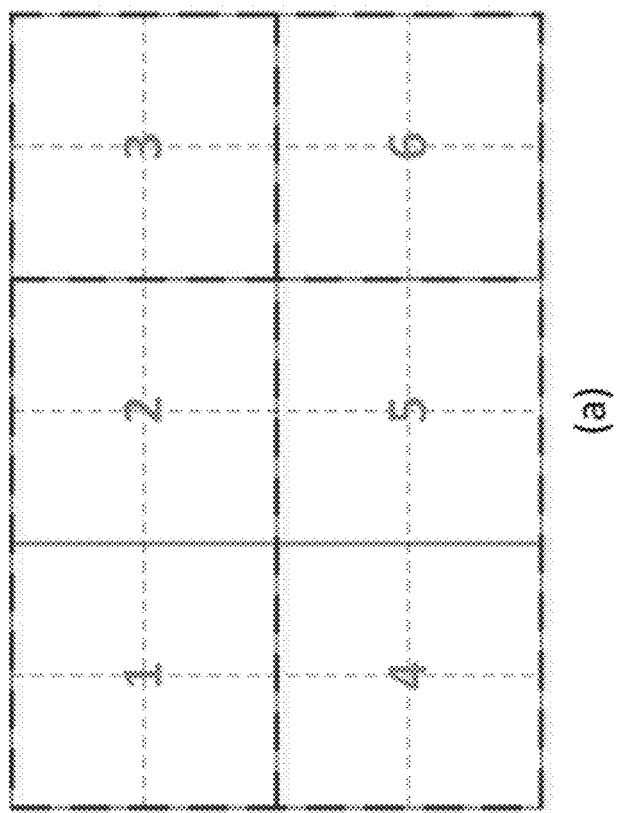

FIG. 6 illustrates examples of tile group partitioning. As shown in FIG. 6, a picture may be partitioned into 6×4 CTBs, and 3×2 tiles where a tile may cover 2×2 CTBs. A tile group may cover an integer number of tiles. A position and/or a shape of a tile group may be specified. For example, the position and/or the shape of the tile group may be specified by addresses of the first and/or last tile in tile raster scan of a picture. For example, the position and shape of the top-right tile group shown in FIG. 6(*a*) may be signaled by tile #3 as a start address. The position and shape of the right tile group shown in FIG. 6(*b*) may be signaled by tile #3 as a start address and tile #6 as an end address.

One or more syntax elements, such as tile_group_id, tile_group_start_address, tile_group_end_address, num_tiles_in_tile_group_minus1, and/or the like of a (e.g., each) tile group, may be signaled (e.g., explicitly signaled). For example, the syntax elements of the tile group may be signaled in parameter set (e.g., PPS, SPS, VPS, and/or the like) or picture header, e.g., to indicate tile group grid for sub-picture extraction. A sub-picture may be coded as a tile group sub-bitstream. The middlebox, extractor, and/or client may determine the tile group grid by parsing the parameter set (e.g., PPS) or picture header (e.g., directly). In examples, the middlebox, extractor, and/or client may extract the corresponding sub-picture bitstream by searching the associated syntax element tile_group_id from a tile group header. In examples, the middlebox, extractor, and/or client may extract the sub-bitstream (e.g., extract directly) with the sub-bitstream byte offset indication. Signaling tile group address (e.g., in tile group header) may configure the middle box and/or the client to parse the tile group headers. Parsing tile group headers may be done to understand the tile group distribution in a picture and/or may determine which tile group data may be extracted.

Figure 7:
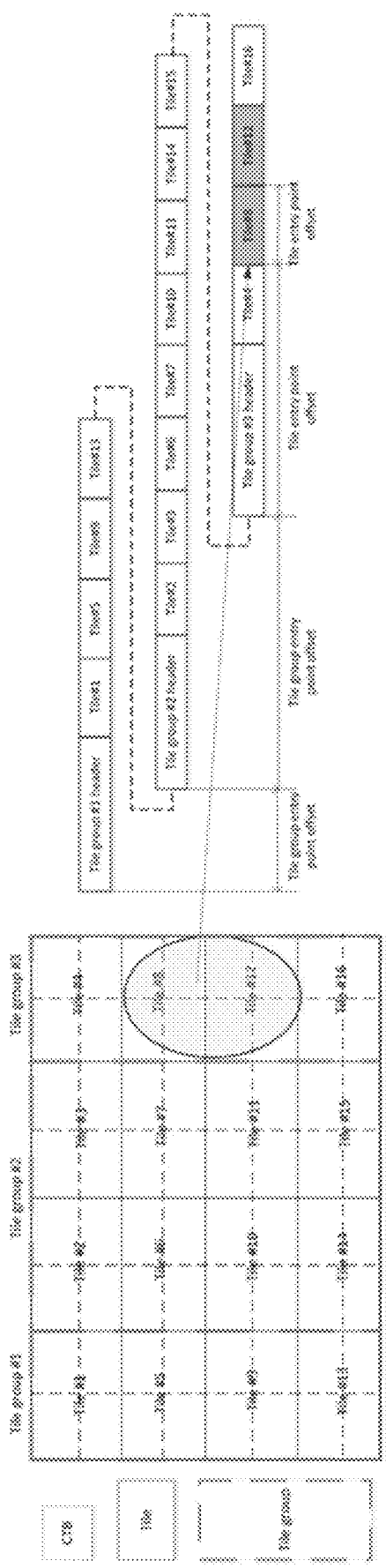
FIG. 7 illustrates an example tile group grid and tile grid partitioning.

FIG. 7 illustrates an example tile group partitioning grid and tile partitioning grid. FIG. 7 shows a tile group partitioning example. A picture may be partitioned into a 4×4 tile grid. The first tile column may be grouped into tile group #1; the second and third tile columns may be grouped into tile group #2; and last tile column may be grouped into tile group #3. Tile group #1 may include a 1×4 tile grid; the tile group #2 may include a of 2×4 tile grid; and the tile group #3 may include of a 1×4 tile grid. The bitstream may be constructed into a sequence of tile group sub-bitstreams. A tile group sub-bitstream may include a sequence of tile sub-bitstreams. A tile grid (e.g., local tile grid) within a tile group may be signaled (e.g., signaled independently). The local tile grid may be consistent before and after the extraction, and the picture level of the overall tile grid may change before and after the extraction. The consistency of the local tile grid may help the sub-picture extraction and reposition process.

If a middlebox or a client plans to extract a ROI located at a tile #8 and/or a tile #12 as circled in FIG. 7, the middlebox and/or the client may parse parameter set (e.g., parse parameter set, such as, PPS first) to figure out the tile partitioning structure and may determine whether the ROI is at the tile #8 and/or at the tile #12. The middlebox and/or the client may parse one or more (e.g., all three) headers of the tile groups, e.g., to determine whether the tile #8 and/or the tile #12 is included in tile group #3. The tile group grid may be signaled (e.g., using a parameter set, such as PPS, or a picture header). Based on the tile group grid (e.g., at the parameter set, such as PPS, or the picture header), the middlebox and/or the client may identify that the ROI is covered by the tile group #3 after (e.g., directly after) parsing the parameter set (e.g., PPS) and/or the picture header. Based on the tile group grid (e.g., at the parameter set, such as PPS, or the picture header), the middlebox and/or the client may extract tile group #3 sub-bitstream with a tile group entry point indicator and may extract (e.g., further extract) tile #8 and/or tile #12, e.g., based on tile entry point indicator.

TABLE 5

Example tile group structure in PPS or picture header

| | Descriptor |
|---|---|
| picture_header( ) { | |
|   picture_header_id | ue(v) |
|   picture_header_picture_parameter_set_id | ue(v) |
|   num_tile_group_minus1 | ue(v) |
|   tile_group_offset_len_minus1 | |
|   for (i = 0; i < num_tile_group_minus1; i ++) { | |
|     tile group_id[i] | ue(v) |
|     num_tiles_in_tile_group_minus1[i] | ue(v) |
|     tile_group_start_address[i] | u(v) |
|     if (num_tiles_in_tile_group_minus1[i] !=0) | |
|       tile_group_end_address[i] | u(v) |
|       tile_group_entry_point_offset_minus1[i] | u(v) |
|   } | |
|   .... | ue(v) |
| } | |

Table 5 illustrates an example tile group partitioning structure in a PPS and/or a picture header as described herein. The extractor may identify a tile group grid from the structure in the PPS and/or the picture header. The extractor may extract associated sub-picture or tile group sub-bitstream. For example, the extractor may extract an associated sub-picture or tile group sub-bitstream based on the syntax element tile_group_id or a tile group entry point if a (e.g., each) sub-picture is coded into a tile group. If an extractor track (e.g., a new extractor track) is formed, the middlebox and/or the extractor may update the tile group grid structure at the parameter set (e.g., PPS) or picture header level (e.g., without directly modifying the tile group sub-bitstream). A client may compose and/or may render the sub-picture together by referring the tile group grid structure at parameter set (e.g., PPS) or picture header.

In examples, the number of tile groups indicated in a parameter set (e.g., PPS) or picture header may specify a region of interest (e.g., a rectangular region of interest) and/or a sub-picture within a picture. An area of the picture may be uncovered by the signaled tile groups (e.g., explicitly signaled tile groups as described herein). The uncovered area by the signaled tile groups (e.g., explicitly signaled tile groups) may form a tile group, and the tile group may be in a non-rectangular shape.

A syntax element tile_group_offset_len_minus1 plus 1 may specify the length (e.g., in bits) of the tile_group_entry_point_offset_minus1[i] syntax element. The value of offset_len_minus1 syntax element may be in the range of 0 to 31, inclusive.

A syntax element tile_group_entry_point_offset_minus1 [i] plus 1 may specify the i-th tile group entry point offset (e.g., in bytes) and may be represented by a syntax element tile_group_offset_len_minus1 plus 1 bits. The first byte of the tile group header may be considered as byte 0. If the first byte is present, emulation prevention bytes that appear in the tile group header and tile group data portion of the coded tile group network abstract layer (NAL) unit may be counted. For example, the emulation prevention bytes may be counted as part of the tile group header and/or tile group data (e.g., for subset identification). Subset 0 may include bytes 0 to the syntax element tile_group_entry_point_offset_minus1 [0], inclusive of the coded tile group header. Tile group data, such as subset k (e.g., with k in the range of 1 to num_tile_group_minus1–1, inclusive), may include bytes firstByte[k] to lastByte[k], inclusive, of the coded tile group header and associated tile group data with firstByte[k] and lastByte[k]. The firstByte[k] and lastByte[k] may be one or more (e.g., all) byte offset. The firstByte[k] and lastByte[k] may be as shown in equation (3) and (4), respectively.

$$firstByte[k] = \sum_{n=1}^{k}(\text{tile\_group\_entry\_point\_offset\_minus1}[n-1]+1) \quad (3)$$

$$lastByte[k] = firstByte[k] + \text{tile\_group\_entry\_point\_offset\_minus1}[k] \quad (4)$$

The syntax element tile_group_offset_len_minus1 and/or the syntax element tile_group_entry_point_offset_minus1 may be signaled. For example, the syntax element tile_group_offset_len_minus1 and/or the syntax element tile_group_entry_point_offset_minus1 may be signaled in a picture header as the value may vary from picture to picture.

TABLE 6

Example tile group header syntax

| | Descriptor |
|---|---|
| tile_group_header( ) { | |
|   tile_group_pic_parameter_set_id | ue(v) |
|   tile_group_id | ue(v) |
|   tile_partitioning( ) | |
|   num_tiles_in_tile_group_minus1 | ue(v) |
|   .... | ue(v) |
| } | |

Figure 8:
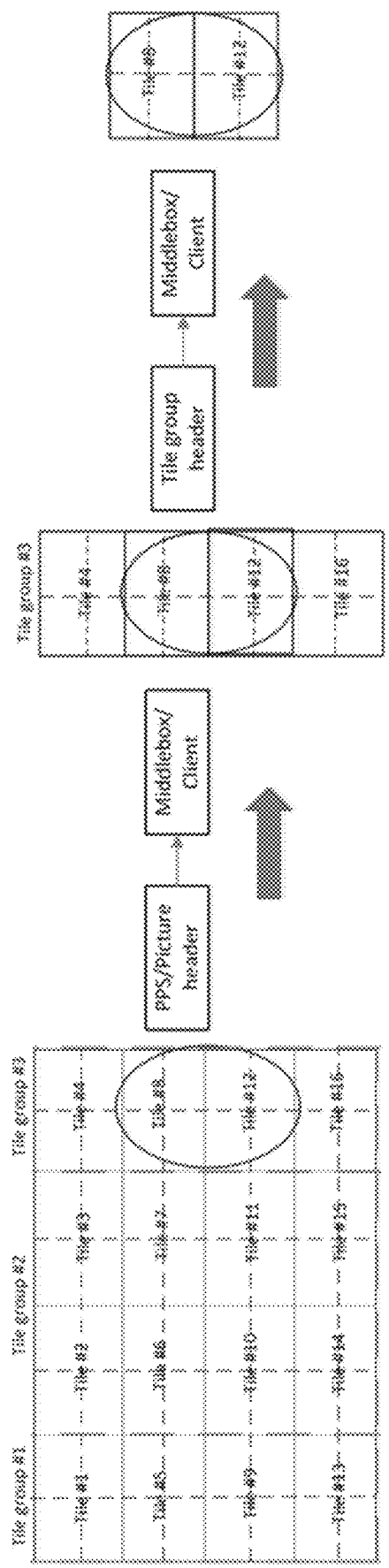
FIG. 8 illustrates an example parsing process for a middlebox and/or a client.

In examples, a local tile grid for a tile group may be derived from a picture tile grid, e.g., signaled in a parameter set, such as PPS, or a picture header. The derived local tile grid structure may be carried in tile group header, e.g., to form a self-contained tile group sub-bitstream for sub-picture extraction and reposition. As shown in FIG. 7, the local tile grid of a (e.g., each) tile group (e.g., 1×4 and/or 2×4) may be derived from the picture tile grid (e.g., 4×4) and/or the tile group grid (e.g., 3×1). Table 6 illustrates an example tile group header syntax. A syntax element tile_partitioning structure may indicate the local tile grid within the tile group. The syntax element tile_partitioning structure may include parameters, such as the tile width and height, the tile group width and height, and/or the tile grid. The middlebox and/or the client may request and/or extract a sub-picture, e.g., based on tile group grid signaled in a parameter set, such as PPS, or picture header. The middlebox and/or the client may decode and/or render particular tiles, e.g., based on the local tile grid and entry point offset signaled in tile group header. FIG. 8 illustrates an example parsing process for a middlebox and/or client as described herein.

In examples, if the boundary of tile group is constrained to span across the entire picture, the tile partitioning syntax structure (e.g., similar tile partitioning syntax structure described in HEVC) may be used to indicate the tile group partitioning structure in a parameter set (e.g., PPS) and/or picture header. The tile group partitioning structure may be specified by tile group columns and rows. A picture may be divided (e.g., evenly divided) into tile group columns and rows, or the width of a (e.g., each) tile group column and height of a (e.g., each) tile group row may be signaled (e.g., explicitly signaled).

Table 7 illustrates an example tile group grid syntax (e.g., for PPS or picture header). A syntax element num_tile_group_columns_minus1 plus 1 may specify the number of tile group columns in a picture. A syntax element num_tile_group_rows_minus1 plus 1 may specify the number of tile group rows in a picture. If a tile group is not uniformly distributed in a picture, the width and height of a (e.g., each) tile group column and row may be specified (e.g., explicitly specified) by the syntax element tile_group_column_width_minus1 and/or the syntax element tile_group_row_height_minus1.

A syntax element motion_constrain_enabled_flag equals 1 may indicate motion constrain may or may not apply to tile group. A syntax element tile_group_motion_constrain_enabled_flag equals to 1 may indicate the associated tile group is motion constrained.

TABLE 7

Example tile group grid syntax for PPS or picture header

| | Descriptor |
|---|---|
| pic_parameter_set_rbsp( ) { | |
| .... | |
|   single_tile_group_in_pic_flag | u(1) |
|   if( !single_tile_group_in_pic_flag ) { | |
|     num_tile_group_columns_minus1 | ue(v) |
|     num_tile_group_rows_minus1 | ue(v) |
|     uniform_tile_group_spacing_flag | u(1) |
|     if( !uniform_tile_group_spacing_flag ) { | |
|       for( i = 0; i < num_tile_group_columns_minus1; i++ ) | |
|         tile_group_column_width_minus1[ i ] | ue(v) |
|       for( i = 0; i < num_tile_group_rows_minus1; i++ ) | |
|         tile_group_row_height_minus1[ i ] | ue(v) |
|     } | |
|     motion_constrain_enabled_flag | u(1) |
|     if (motion_constrain_enabled_flag) { | |
|       for (i = 0; i <= num_tile_group_mins1; i++) | |
|         tile_group_motion_constrain_enabled_flag[i] | u(1) |
|     } | |
|   } | |
| .... | |
| } | |

Figure 9:
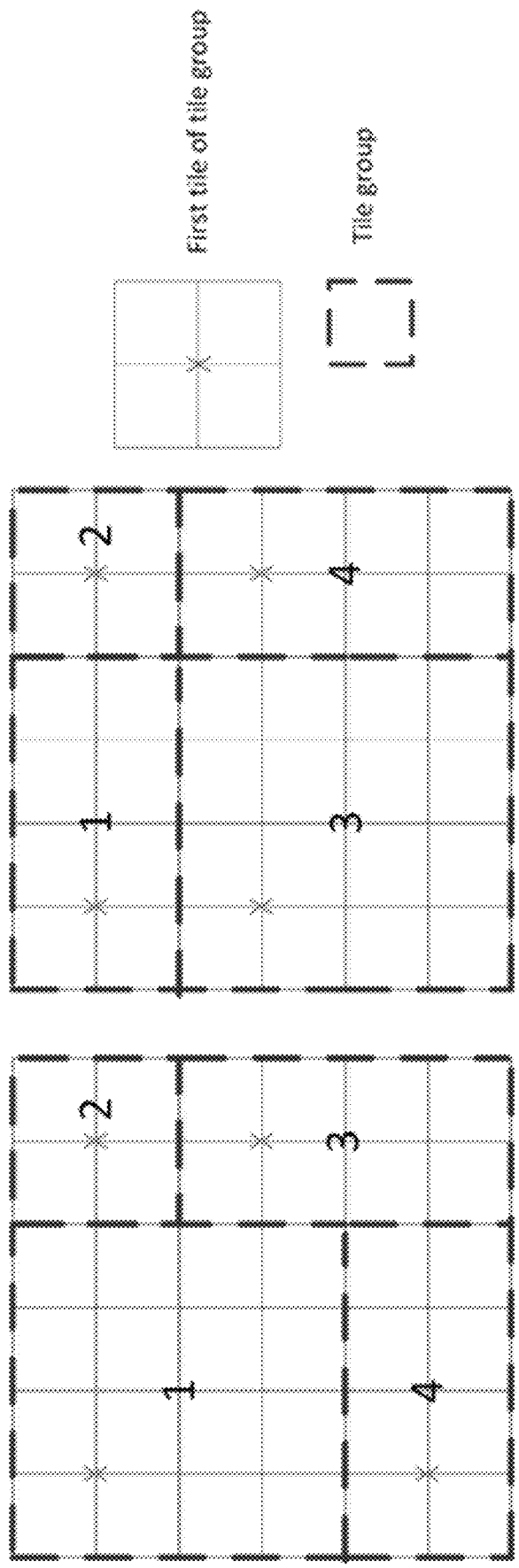
FIG. 9 illustrates an example of tile group scanning order.

The tile group id and/or index may be specified. For example, the tile group id and/or index may be specified in the order of the tile group's top-left tile raster scan address of a picture. FIG. 9 illustrates an example tile group scanning order, e.g., based on tile raster scan address. FIG. 9 illustrates an example where a tile group index may be set in the order of the address of the first tile (e.g., marked as X) of a tile group in raster scan order of a picture.

Figures 10A, 10B, 10C:
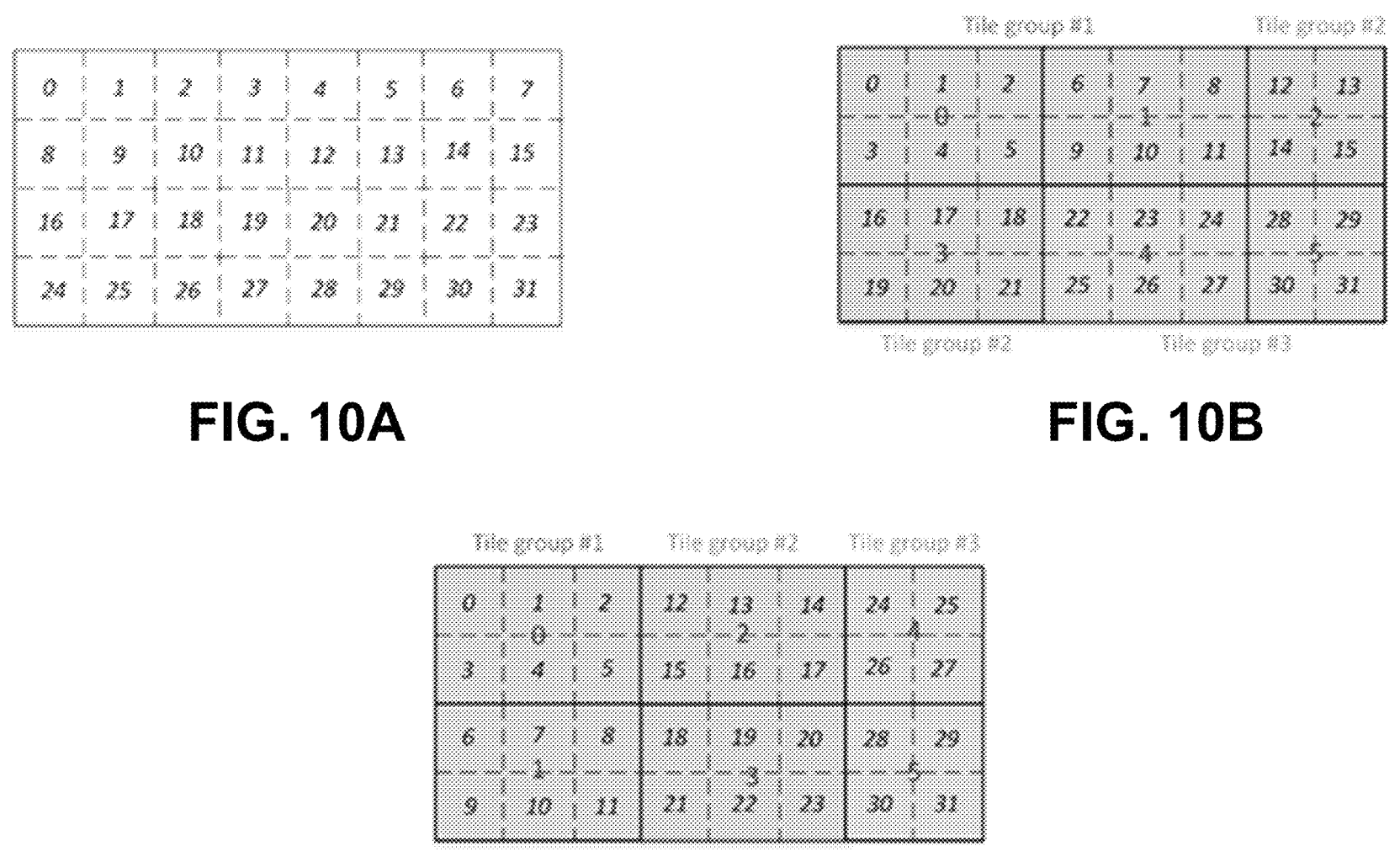

Bottom-to-top tile group partitioning may comprise coding tree block (CTB) raster and tile scanning processing. A tile group may be or may include a sequence of tiles in tile raster scan of a picture. CTB raster and tile scanning conversion may be applied. Tiles may not be grouped (e.g., not sequentially grouped) into a tile group. The CTB raster and tile scanning conversion may support a rectangular tile group. FIGS. 10A, 10B, and 10C illustrate example raster and tile scanning processes. FIG. 10A illustrates an example CTB raster scan of a picture. FIG. 10B illustrates an example CTB tile scan for tile groups of a sequence of tiles in a tile raster scan of a picture. FIG. 10C illustrates an example CTB tile scan using a rectangular tile group as described herein.

Syntax elements, such as PicSizeInCtbsY, PicWidthInCtbsY, ctbAddrRs, colWidth, rowHeight, colBd, and/or rowBd may be used in the conversion processing described herein.

List tileGroupWidthInCTBs[i] and list tileGroupHeightInCTBs[i] for i may range from 0 to num_tile_groups_minus1, inclusive. The list tileGroupWidthInCTBs[i] and list tileGroupHeightInCTBs[i] for i may specify the width and height of the i-th tile group in units of CTBs and may be derived as follows:

```
for( i = 0; i <= num_tile_groups_minus1; i++ )
    for(j = tile_group_start_address[i] % ( num_tile_columns_minus1 + 1 ); j <=
    tile_group_end_address[i] % (num_tile_columns_minus1 + 1); j++)
        tileGroupWidthInCTBs[i] += colWidth[j]
    for (j = tile_group_start_address[i] / (num_tile_columns_minus1 + 1); j <=
    tile_group_end_address[i] / (num_tile_columns_minus1 + 1); j++)
        tileGroupHeightInCTBs[i] += rowHeight[j]
```

List tgLeft[i] for i may range from 0 to num_tile_groups_minus1, inclusive. A syntax element tile group may be or may include tile_group or tileGroup. The list tgLeft[i] for i may specify the location of the i-th tile group left boundary in units of CTBs and may be derived as follows:

```
for( i = 0; i <= num_tile_groups_minus1; i++ )
    tgLeft[i] = colBd[tile_group_start_address[i] %
    (num_tile_columns_minus1 + 1)]
```

List tgRight[i] for i may range from 0 to num_tile_groups_minus1, inclusive. The list tgRight[i] for i may specify the location of the i-th tile group right boundary in units of CTBs and may be derived as follows:

```
for( i = 0; i <= num_tile_groups_minus1; i++ )
    tgRight[i] = tgLeft[i] + tileGroupWidthInCTBs[i]
```

List tgTop[i] for i may range from 0 to num_tile_groups_minus1, inclusive. The list tgTop[i] for i may specify the location of the i-th tile group top boundary in units of CTBs and may be derived as follows:

```
for( i = 0; i <= num_tile_groups_minus1; i++ )
    tgTop[i] = rowBd[tile_group_start_address[i] /
    (num_tile_row_minus1 + 1)]
```

List tgBot[i] for i may range from 0 to num_tile_groups_minus1, inclusive. The list tgBot[i] for i may specify the location of the i-th tile group right boundary in units of CTBs and may be derived as follows:

```
for( i = 0; i <= num_tile_groups_minus1; i++ )
    tgBot[i] = tgTop[i] + tileGroupHeightInCTBs[i]
```

List CtbAddrRsToTs[ctbAddrRs] for ctbAddrRs may range from 0 to PicSizeInCtbsY−1, inclusive. The list CtbAddrRsToTs[ctbAddrRs] for ctbAddrRs may specify the conversion from a CTB address in CTB raster scan of a picture to a CTB address in tile scan and may be derived as follows. Syntax element tgIdx may be or may include tileGroupIdx.

```
for( ctbAddrRs = 0; ctbAddrRs < PicSizeInCtbsY; ctbAddrRs++ ) {
    tbX = ctbAddrRs % PicWidthInCtbsY
    tbY = ctbAddrRs / PicWidthInCtbsY
    for( i = 0; i <= num_tile_groups_minus1; i++ )
        if (tbX >= tgTop[i] && tbX < tgBot[i] && tbY >= tgLeft[i]
            && tbY < tgRight[i]))
            tgIdx = i
    for( numCtb = 0, i = 0; i < tgIdx; i++ )
        numCtb += (tileGroupWidthInCTBs[i] *
        tileGroupHeightInCTBs[i])
    tbX0 = tgLeft[tgIdx] % PicWidthInCtbsY
    tbY0 = tgTop[tgIdx] / PicWidthInCtbsY
    CtbAddrRsToTs[ ctbAddrRs ] = numCtb + (tbY − tbY0) *
tileGroupWidthInCTBs[tgIdx] + (tbX − tbX0)
}
```

Figure 11A:
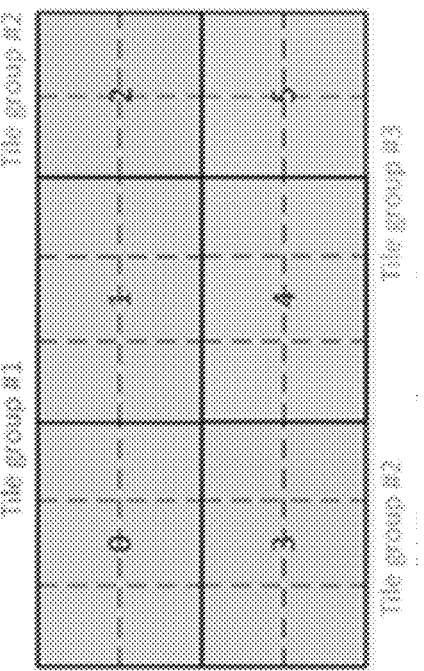
FIGS. 11A, 11B, and 11C illustrate example tile raster scanning and tile group scanning implementations.
Figure 11B:
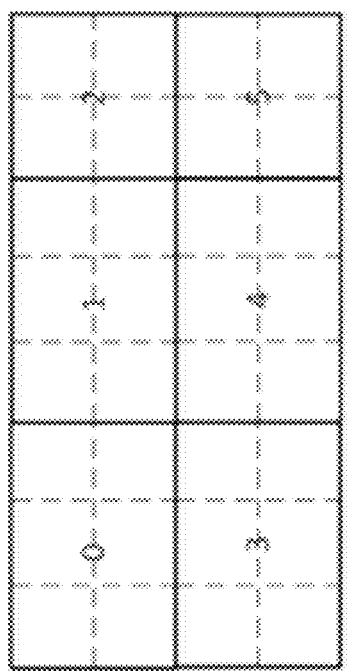
Figure 11C:
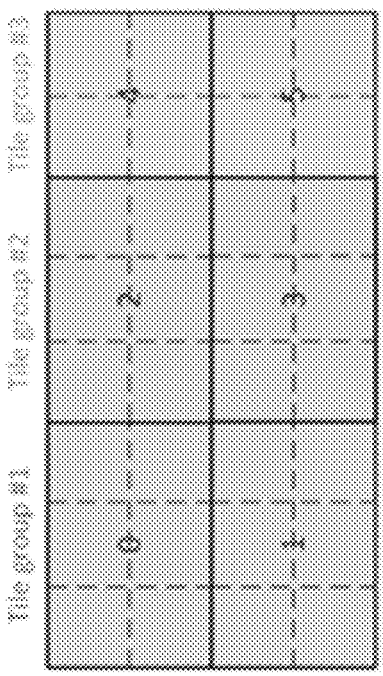

Bottom-to-top tile group partitioning may involve tile raster and tile group scanning conversion processing. Tile group scan may be ordering of tiles (e.g., sequential ordering of tiles) partitioning a picture in which the tiles are ordered (e.g., ordered consecutively) in tile raster scan in a tile group. The tile raster of a picture and tile scanning of a tile group conversion may support rectangular tile groups. FIGS. 11A, 11B, and 11C illustrate example tile scanning processing. FIG. 11A illustrates an example tile raster scan of a picture. FIG. 11B illustrates an example tile group scan for sequential tiles in raster scan of a picture. FIG. 11C illustrates an example tile group scan for rectangular tile groups as described herein.

List TileAddrRsToTGs[tileAddrRs] for tileAddrRs may range from 0 to NumTilesInPic−1, inclusive. The list TileAddrRsToTGs[tileAddrRs] for tileAddrRs may specify the conversion from a tile address in tile raster scan of a picture to a tile address in tile group scan and may be derived as follows. Syntax element NumTilesInPic may be the total number of tiles of a picture.

```
for( tileAddrRs = 0; tileAddrRs < NumTilesInPic; tileAddrRs++ ) {
    tileX = tileAddrRs % (num_tile_columns_minus1 + 1)
    tileY = tileAddrRs / (num_tile_columns_minus1 + 1)
    for( i = 0; i <= num_tile_groups_minus1; i++ )
        if ( tileX >= tile_group_start_address[i] % (num_tile_columns_minus1 + 1)
            && tileX < (tile_group_end_address % (num_tile_columns_minus1 + 1) +
            1)
            && tileY >= tile_group_start_address[i] / (num_tile_columns_minus1 + 1)
            && tileY < (tile_group_end_address / (num_tile_columns_minus1 + 1) + 1)
        )
            tgIdx = i
    for( numTiles = 0, i = 0; i < tgIdx; i++ )
        numTiles += (num_tiles_in_tile_group_minus1[i] + 1)
    tileX0 = tile_group_start_addr[tgIdx] % (num_tile_columns_minus1 + 1)
    tileY0 = tile_group_start_addr[tgIdx] / (num_tile_columns_minus1 + 1)
    tileGroupWidthInTiles = (tile_group_end_addr[tgIdx] % (num_tile_columns_minus1 + 1)) −
(tile_group_start_addr[tgIdx] % (num_tile_columns_minus1 + 1)) + 1
    TileAddrRsToTGs[ tileAddrRs ] = numTiles + (tileY − tileY0) * tileGroupWidthInTiles + (tileX
    − tileX0)
}
```

List TileAddrTGsToRs[tileAddrTGs] for tileAddrTGs may range from 0 to NumTilesInPic−1, inclusive. The list TileAddrTGsToRs[tileAddrTGs] for tileAddrTGs may specify the conversion from a tile address in tile group scan to a tile address in raster scan of a picture and may be derived as follows:

```
for( tileAddrRs = 0; tileAddrRs < NumTilesInPic; tileAddrRs++ )
    TileAddrTGsToRs[ TileAddrRsToTGs[ tileAddrRs ] ] = tileAddrRs
```

Bottom-to-top tile group partitioning may employ deriving a Tile ID. List TileId[ctbAddrTs] for ctbAddrTs may range from 0 to PicSizeInCtbsY−1, inclusive. The list TileId[ctbAddrTs] for ctbAddrTs may specify the conversion from a CTB address in a tile scan to a tile ID and may be derived as follows:

```
for( i = 0, tileIdx = 0; i <= num_tile_group_minus1; i++ ) {
    tileGroupHeightInTiles[i]= tile_group_end_address[i]/(num_tile_columns_minus1 + 1) -
    tile_group_start_address[i]/(num_tile_columns_minus1 + 1) + 1
    tileGroupWidthInTiles[i]= tile_group_end_address[i]%(num_tile_columns_minus1 +1) -
    tile_group_start_address[i]%(num_tile_columns_minus1 + 1) + 1
    for(m = 0; m < TileGroupHeightInTiles[ i ]; m++)
        for(n = 0; n < TileGroupWidthInTiles[ i ]; n++, tileIdx++ )
            for( y = tgTop[i]; y < tgBottom[i]; y+= PicWidthInCtbsY )
                for( x = tgLeft[i]; x < tgRight[i]; x++ )
                    TileId[ CtbAddrRsToTs[ y * tileGroupWidthInCTBs[i]+ x ] ] = tileIdx
}
```

Tile group partitioning may employ a tile group data structure as described herein. For example, based on the conversion from CTB raster scan to tile scan and from CTB address in tile scan, a tile group address may not be included in the tile group header and/or the tile group data structure as shown in Table 8.

TABLE 8

Example tile group data structure

| | Descriptor |
|---|---|
| tile_group_data( ) { | |
|     coding_tree_unit( ) | |
|     CtbAddrInTs++ | |
|     CtbAddrInRs = CtbAddrTsToRs[ CtbAddrInTs ] | |
|     end_of_tile_one_bit /* equal to 1 */ | ae(v) |
|     if( i < num_tiles_in_tile_group_minus1 ) | |
|         byte_alignment( ) | |
|     } | |
| } | |

Top-to-bottom tile group partitioning may be employed to provide rectangular tile group structure. Top-to-bottom group tile partitioning may divide a picture into one or more tile groups. The tile groups may include an integer number of CTBs (e.g., to cover a rectangular area). The tile group may be divided into one or more (e.g., multiple) tiles. The tile group grid may be signaled in a parameter set (e.g., PPS) and/or picture header. The local tile grid (e.g., default tile grid) within a (e.g., each) tile group may be signaled in a parameter set (e.g., PPS), picture header, tile group header, and/or the like. A different local tile grid may be signaled in tile group header to override the default tile grid signaled in the parameter set (e.g., PPS) or picture header.

A (e.g., each) tile group in the top-to-bottom approach described herein may be a self-contained entity. For example, a tile group in top-to-bottom approach described herein may be a self-contained entity with a local tile partitioning grid and the grid (e.g., local tile partitioning grid) may be independent to the tile grid of other tile groups. For some video applications, a middlebox and/or a client may stitch one or more tile groups from different bitstreams and may combine the one or more tile groups from different bitstreams to form a bitstream (e.g., a new bitstream). The picture tile grid of the bitstream (e.g., the new bitstream) may use and/or may signal using a different tile column and tile row structure and the type of combination of different tile groups may be limited. The top-to-bottom tile group approach may skip the picture tile grid signaling and may simplify the bitstream stitching process. The top-to-bottom tile group approach described herein may allow more types of tile group based sub-bitstream extraction, reposition, and/or combination.

A tile group grid structure may be signaled (e.g., in a parameter set (e.g., PPS) and/or in a picture header). Table 9 provides an example tile group structure. A tile group position may be specified with a syntax element tile_group_start_address and/or a syntax element tile_group_end_address. The syntax element tile_group_start_address and/or the syntax element tile_group_end_address may specify the address of the first CTB (e.g., or top-left CTB) in CTB raster scan of a picture and the address of the last CTB (e.g., or bottom-right CTB) in the CTB raster scan of a picture, respectively. The tile partitioning structure (e.g., specified in HEVC) or flexible tile partitioning structure may be signaled in the syntax element tile_partitioning structure to indicate the default tile partitioning that may be applicable to a (e.g., each) tile group.

TABLE 9

Example tile group structure

| | Descriptor |
|---|---|
| picture_parameter_set( ) { | |
|     .... | |
|     num_tile_group_minus1 | ue(v) |
|     for (i = 0; i < num_tile_group_minus1; i ++) { | |
|         tile_group_id[i] | ue(v) |
|         tile_group_start_address[i] | u(v) |
|         tile_group_end_address[i] | u(v) |
|         tile_partitioning( ) | |
|     } | |
|     .... | ue(v) |
| } | |

In examples, a tile partitioning structure list may be signaled in a parameter set (e.g., PPS) or picture header. An index may be assigned to a (e.g., each) tile partitioning grid (e.g., default tile partitioning grid). A tile group may refer to a specific list index to indicate the tile partitioning structure. A tile partitioning override indication (e.g., an override flag) may be signaled in a tile group header. If a tile partitioning override indication (e.g., an override flag) equals 1, the tile group may specify a tile partitioning structure that may have been excluded from tile partitioning list (e.g., a new tile partitioning structure).

Table 10 illustrates an example tile partitioning list syntax structure. A syntax element tile_grid_override_enabled_flag equal to 1 may indicate that a tile group may or may not use a new tile grid (e.g., that is not included in the tile partitioning list).

TABLE 10

Example tile partitioning list

| | Descriptor |
|---|---|
| tile_partitioning_list( ) { | |
|     num_tile_partitioning_minus1 | ue(v) |
|     tile_grid_override_enabled_flag | u(1) |

TABLE 10-continued

Example tile partitioning list

| | Descriptor |
|---|---|
| for (i = 0; i <= num_tile_partitioning_minus1; i ++) {<br>  tile_partitioning( )<br>}<br>} | |

Table 11 illustrates an example tile partitioning reference field in a tile group header. Table 11 illustrates that the tile group may refer to a partitioning structure signaled in the partitioning list or may use a new tile partitioning grid.

If a syntax element tile_partitioning_override_enabled_flag is not set or a syntax element tile_grid_is_overrided equals 0, tile group may refer to a tile partitioning signaled in a PPS or picture header. If a syntax element tile_grid_is_overrided equals 1, a new tile partitioning structure may be signaled at a tile group header. If a syntax element tile_grid_is_overrided is not present, the value of the tile_grid_is_overrided syntax element may be inferred to 0.

TABLE 11

Example tile partitioning reference field at tile group header

| | Descriptor |
|---|---|
| tile_group_header( ) {<br>  tile_group_pic_parameter_set_id<br>  tile_group_id<br>  if (tile_grid_override_enable_flag)<br>    tile_grid_is_overrided<br>  if( !tile_grid_is_overrided)<br>    tile_partitioning_list_index<br>  else<br>    tile_partitioning( )<br>  ....<br>} | <br>ue(v)<br>ue(v)<br><br>u(1)<br><br>ue(v) |

The boundary of tile groups may be constrained to span across an entire picture. The region-based signaling for flexible tile may be used in a PPS or picture header. A (e.g., each) grid region may be a tile group.

Tiles may be partitioned within a (e.g., each) tile group. As one or more tiles are partitioned within a (e.g., each) tile group, CTB raster and tile group scanning process may be specified as follows.

Top-to-bottom tile group partitioning may employ CTB raster and tile scanning conversion processing. List TileGroupWidthInCtbsY[i] and list TileGroupHeightInCtbsY[i] for i may range from 0 to num_tile_groups_minus1, inclusive. The list TileGroupWidthInCtbsY[i] and list TileGroupHeightInCtbsY[i] for i may specify the width and height of the i-th tile group units of CTBs and may be derived as follows:

```
for( i = 0; i <= num_tile_groups_minus1; i++ )
    TileGroupWidthInCtbsY[ i ] = tile_group_end_address[i] %
        PicWidthInCtbsY - tile_group_start_address[i] %
        PicWidthInCtbsY + 1
for( i = 0; i <= num_tile_groups_minus1; i++ )
    TileGroupHeightInCtbsY[ i ] = tile_group_end_address[i] /
        PicWidthInCtbsY - tile_group_start_address[i] /
        PicWidthInCtbsY + 1
```

List tgLeft[i] for i may range from 0 to num_tile_groups_minus1, inclusive. The list tgLeft[i] for i may specify the location of the i-th tile group left boundary in units of CTBs and may be derived as follows:

```
for( i = 0; i <= num_tile_groups_minus1; i++ )
    tgLeft[ i ] = tile_group_start_address[ i ] %
        TileGroupWidthInCtbsY[ i ]
```

List tgRight[i] for i may range from 0 to num_tile_groups_minus1, inclusive. The list tgRight[i] for I may specify the location of the i-th tile group right boundary in units of CTBs and may be derived as follows:

```
for( i = 0; i <= num_tile_groups_minus1; i++ )
    tgRight[ i ] = tgLeft[ i ] + TileGroupWidthInCtbsY[ i ]
```

List tgTop[i] for i ranging from 0 to num_tile_groups_minus1, inclusive. The list tgTop[i] for i may specify the location of the i-th tile group top boundary in units of CTBs and may be derived as follows:

```
for( i = 0; i <= num_tile_groups_minus1; i++ )
    tgTop[ i ] = tile_group_start_address[ i ] %
        TileGroupWidthInCtbsY[ i ]
```

List tgBot[i] for i may range from 0 to num_tile_groups_minus1, inclusive. The list tgBot[i] for i may specify the location of the i-th tile group right boundary in units of CTBs and may be derived as follows:

```
for( i = 0; i <= num_tile_groups_minus1; i++ )
    tgBot[ i ] = tgTop[ i ] + TileGroupHeightInCtbsY[ i ]
```

List colWidth[i][j] for j may range from 0 to num_tile_columns_minus1[i], inclusive. The list colWidth[i][j] for j may specify the width of the j-th tile column of i-th tile group in units of CTBs and may be derived as follows:

```
if( uniform_spacing_flag )
    for( j = 0; j <= num_tile_columns_minus1[ i ]; j++ )
        colWidth[ i ][ j ] = (( j + 1) * TileGroupWidthInCtbsY[ i ]) / (num_tile_columns_minus1[ i ] + 1)
            - ( j * TileGroupWidthInCtbsY[ i ] ) / (num_tile_columns_minus1[ i
            ] + 1 )
else {
    colWidth[ i ][ num_tile_columns_minus1[ i ] ] = TileGroupWidthInCtbsY[ i ]
    for( j = 0; j < num_tile_columns_minus1; j++ ) {
        colWidth[ i ][ j ] = column_width_minus1[ i ] [ j ] + 1
        colWidth[ i ][ num_tile_columns_minus1[ i ] ] -= colWidth[ i ] [ j ]
    }
}
```

List rowHeight[j] for j may range from 0 to num_tile_rows_minus1, inclusive. The list rowHeight[j] for j may specify the height of the j-th tile row in units of CTBs and may be derived as follows:

```
if( uniform_spacing_flag )
    for( j = 0; j <= num_tile_rows_minus1[ i ]; j++ )
        rowHeight[ i ] [ j ] = ( ( j + 1 ) * TileGroupHeightInCtbsY[ i ] ) / ( num_tile_rows_minus1[ i ] + 1 )
            - ( j * TileGroupHeightInCtbsY[ i ] ) / (
            num_tile_rows_minus1[ i ] + 1 )
else {
    rowHeight[ i ] [ num_tile_rows_minus1 ] = TileGroupHeightInCtbsY[ i ]
    for( j = 0; j < num_tile_rows_minus1; j++ ) {
        rowHeight[ i ] [ j ] = row_height_minus1[ i ] [ j ] +1
        rowHeight[ i ] [ num_tile_rows_minus1 ] -= rowHeight[ i ] [ j ]
    }
}
```

List colBd[i][j] for i may range from 0 to num_tile_columns_minus1[i]+1, inclusive. The list colBd[i][j] for i may specify the location of the j-th tile column boundary of i-th tile group in units of CTBs and may be derived as follows:

```
for( colBd[ i ] [ 0 ] = 0, j = 0; j <= num_tile_columns_minus1[ i ];
j++ )
    colBd[ i ] [ j + 1 ] = colBd[ j ] + colWidth[ i ] [ j ]
```

List rowBd[i][j] for j may range from 0 to num_tile_rows_minus1[i]+1, inclusive. The list rowBd[i][j] for j may specify the location of the j-th tile row boundary of i-th tile group in units of CTBs and may be derived as follows:

```
for( rowBd[ 0 ] = 0, j = 0; j <= num_tile_rows_minus1[ i ]; j++ )
    rowBd[ i ] [ j + 1 ] = rowBd[ i ] [ j ] + rowHeight[ i ] [ j ]
```

List CtbAddrRsToTs[ctbAddrRs] for ctbAddrRs may range from 0 to PicSizeInCtbsY−1, inclusive. The list CtbAddrRsToTs[ctbAddrRs] for ctbAddrRs may specify the conversion from a CTB address in CTB raster scan of a picture to a CTB address in tile scan and may be derived as follows:

```
for( ctbAddrRs = 0; ctbAddrRs < PicSizeInCtbsY; ctbAddrRs++ ) {
    tbX = ctbAddrRs % PicWidthInCtbsY
    tbY = ctbAddrRs / PicWidthInCtbsY
    for( i = 0; i <= num_tile_groups_minus1; i++ )
        if (tbX >= tgTop[i] && tbX < tgBot[i] && tbY >= tgLeft[i] && tbY < tgRight[i]))
            tgIdx = i
    for( numCtb = 0, i = 0; i < tgIdx; i++ )
        numCtb += ( TileGroupWidthInCtbsY[ i ] * TileGroupHeightInCtbsY[ i ] )
    tbX -= tgLeft[ tgIdx ] % PicWidthInCtbsY
    tbY -= tgTop[ tgIdx ] / PicWidthInCtbsY
    for( i = 0; i <= num_tile_columns_minus1[ tgIdx ]; i++ )
        if( tbX >= ColBd[ tgIdx ][ i ] )
            tileX = i
    for( j = 0; j <= num_tile_rows_minus1[ tgIdx ]; j++ )
        if( tbY >= RowBd[ tgIdx ][ j ] )
            tileY = j
    CtbAddrRsToTs[ ctbAddrRs ] = numCtb
    for( i = 0; i < tileX; i++ )
        CtbAddrRsToTs[ ctbAddrRs ] += rowHeight[ tgIdx ][ tileY ] * colWidth[ tgIdx ][ i ]
    for( j = 0; j < tileY; j++ )
        CtbAddrRsToTs[ ctbAddrRs ] += TileGroupWidthInCtbsY[ tgIdx ] * rowHeight[ tgIdx
        ][ j ]
    CtbAddrRsToTs[ ctbAddrRs ] += ( tbY − rowBd[tgIdx][tileY] ) * colWidth[ tgIdx ][ tileX ] + tbX
        − colBd[tgIdx][tileX]
}
```

List CtbAddrTsToRs[ctbAddrTs] for ctbAddrTs may range from 0 to PicSizeInCtbsY−1, inclusive. The list CtbAddrTsToRs[ctbAddrTs] for ctbAddrTs may specify the conversion from a CTB address in tile scan to a CTB address in CTB raster scan of a picture and may be derived as follows:

```
for( ctbAddrRs = 0; ctbAddrRs < PicSizeInCtbsY; ctbAddrRs++ )
    CtbAddrTsToRs[ CtbAddrRsToTs[ ctbAddrRs ] ] = ctbAddrRs
```

Figures 12A, 12B, 12C:
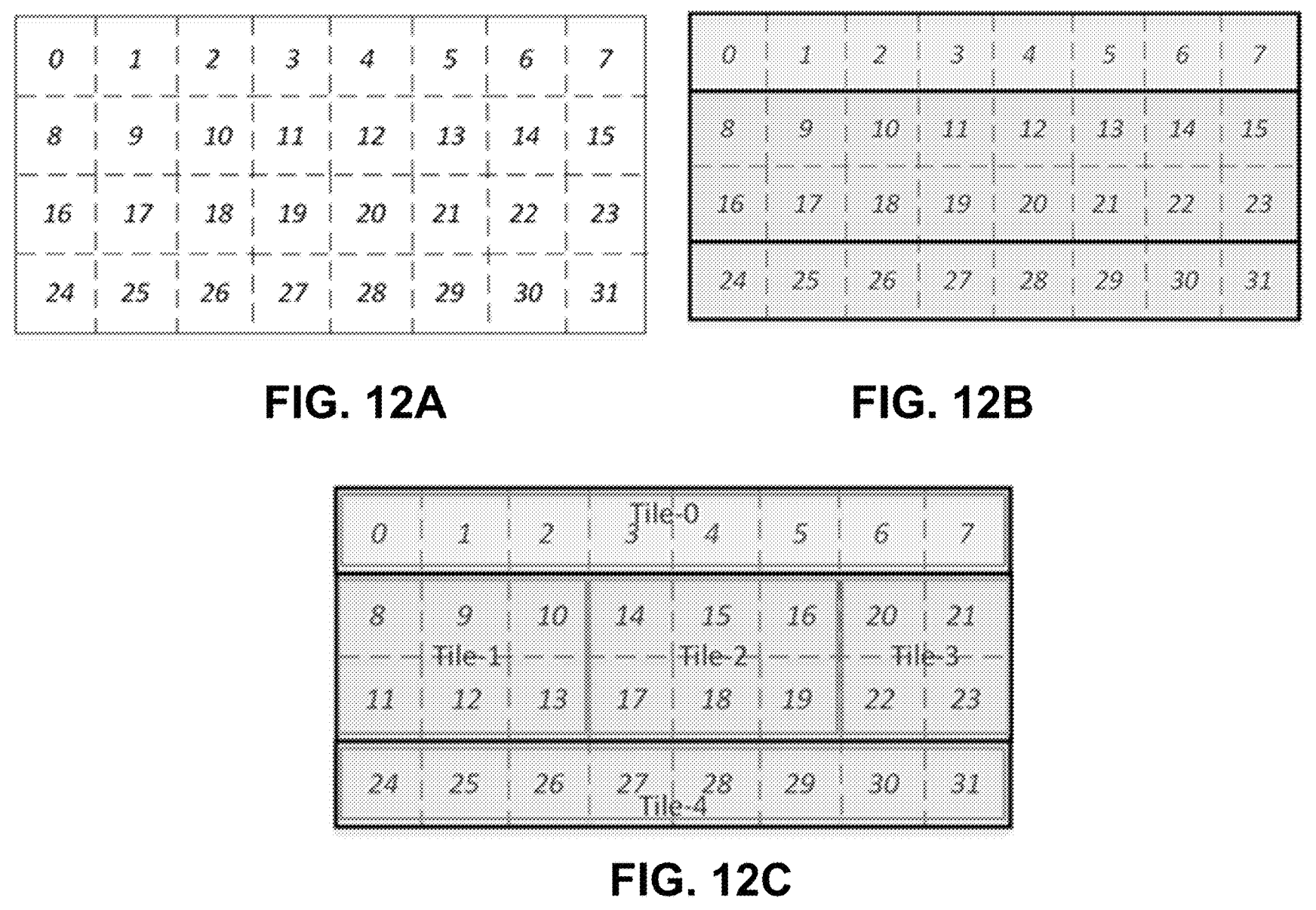

FIGS. 12A, 12B, and 12C illustrate examples of CTB raster and tile group scanning. For example, a picture may be partitioned into 8×4 CTBs and 3 tile groups (e.g., as shown in FIGS. 12A-C). The first and third tile groups may include a tile. The second tile group may include 3×1 tiles. CTB raster scan of a picture may be illustrated in FIG. 12A. Tile group partitioning may be illustrated in FIG. 12B. CTB tile scan may be illustrated in FIG. 12C.

Tile ID may be derived. List TileId[ctbAddrTs] for ctbAddrTs may range from 0 to PicSizeInCtbsY−1, inclusive. List TileId[ctbAddrTs] for ctbAddrTs may specify the conversion from a CTB address in tile scan to a tile ID and may be derived as follows:

```
for( i = 0, numCtbs = 0, tileIdx = 0; i <= num_tile_group_minus1; i++ ) {
    for( m = 0, m <= num_tile_rows_minus1[i]; m++ )
        for( n = 0; n <= num_tile_columns_minus1[i]; n++, tileIdx++ )
            for( y = rowBd[i][ m ]; y < rowBd[i][ m +1 ]; y++ )
                for( x = colBd[ i ][n]; x < colBd[i][ n +1 ]; x++ )
                    TileId[ numCtbs + y * TileGroupWidthInCtbsY[i]+ x ] ] =
                        tileIdx
    numCtbs += TileGroupWidthInCtbs[i] * TileGroupHeightInCtbs[i]
}
```

MCTS may be supported in tile groups (e.g., or at the tile group level). MCTS may allow a tile set to be decoded (e.g., decoded independently) from other tiles excluded in the set. A MCTS sub-bitstream may be extracted and/or may be repositioned. In examples, a MCTS sub-bitstream may be extracted and/or may be repositioned with other MCTS sub-bitstreams to form a conformance bitstream to be decoded and rendered. In examples, a MCTS sub-bitstream may be extracted and/or may be repositioned without other MCTS sub-bitstreams to form a conformance bitstream to be decoded and rendered. An indicator may be signaled for a (e.g., each) tile group to specify the entire tile group may be a motion constrained tile set, or a (e.g., each) tile within the tile group may be a motion constrained tile set. A syntax structure (e.g., similar to temporal MCTSs SEI message) may be signaled at parameter set (e.g., PPS), picture header, or tile group header to indicate one or more (e.g., multiple) MCTSs within a tile group.

Table 12 illustrates example motion constrained tile group (MCTG) signaling for a tile group. The signaling may be carried in a parameter set (e.g., PPS), picture header, and/or tile group header. For example, the signaling may be carried in a parameter set (e.g., PPS), picture header, and/or tile group header to specify whether a tile group is motion constrained or not.

A syntax element tile_group_one_tile_set_flag[i] may indicate the i-th tile group or the tile group with ID equal to i is a MCTS.

One or more indications (e.g., additional flags) may be signaled outside tile group loop to specify whether a (e.g., each) tile group within a picture is MCTS or not, and whether a (e.g., each) tile within a picture is a MCTS or not. If a (e.g., each) tile within a picture is a MCTS or a (e.g., each) tile group is motion constrained, MCTG signaling may be skipped.

TABLE 12

Temporal motion constrained tile group (MCTG) signaling

| | Descriptor |
|---|---|
| temporal_motion_constrained_tile_group( tile_group_idx) | |
| { | |
|   each_tile_one_tile_set_flag[tile_group_id] | u(1) |
|   if (!each_tile_one_set_flag) | |
|     tile_group_one_tile_set_flag[tile_group_id] | u(1) |
|   .... | |
| } | |

Tile group signaling may support equal-resolution MCTS-based viewport-dependent scheme (e.g., as shown in FIG. 3). If a tile group id is presented in tile group header, the id (e.g., tile group id) may assign (e.g., updated to assign) a unique id to a (e.g., each) tile group.

Figure 13:
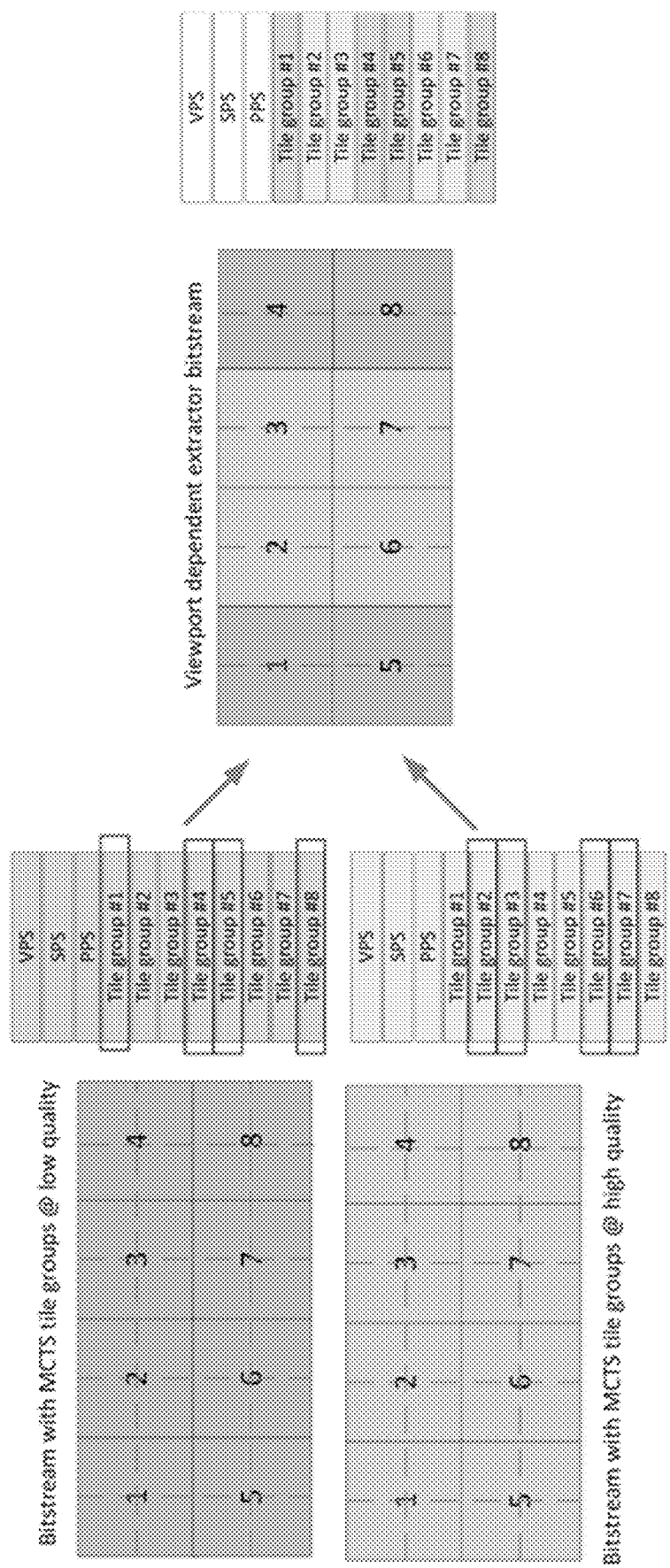
FIG. 13 illustrates example merging of MCTS-based sub-picture tile groups.

FIG. 13 illustrates an example of merging of MCTS-based sub-picture tile groups of the same resolution. For example, FIG. 13 illustrates that high-quality and low-quality tile groups may be extracted and may merge the tile groups together to form a viewport dependent bitstream, e.g., without rewriting low level bitstream. As shown in FIG. 13, tile group sub-bitstreams associated with high quality sub-picture #2, #3, #6, and #7 from bitstream with quality 2 may be extracted, and tile group sub-bitstream associated with low quality sub-picture #1, #5, #4, and #8 from bitstream with quality 1 may be extracted. The extracted subpictures may be merged to form a viewport dependent bitstream (e.g., without rewriting low level bitstream). A (e.g., each) sub-picture may include of one or more (e.g., multiple) tiles. In examples, the local tile grid within a (e.g., each) tile group may be the same. In examples, the local tile grid between different tile groups may not be the same. The picture level tile grid between bitstream at quality 1 and bitstream at quality 2 may be different.

Tile group grid may be signaled in a parameter set (e.g., PPS) and/or picture header. As a tile group grid is signaled in a parameter set (e.g., PPS) or picture header, a middlebox and/or a client may identify the corresponding high quality and/or low quality tile group after parsing a parameter set (e.g., PPS) and/or picture header and may skip parsing a (e.g., individual) tile group header. After extracting a (e.g., each) sub-bitstream based on tile group entry point, the middlebox and/or the client may merge the sub-bitstreams together, e.g., without modifying the tile group header or tile group data as a (e.g., each) tile group sub-bitstream is self-contained with local tile grid signaled in tile group header. The middlebox and/or the client may generate a new parameter set or a picture header, e.g., by copying the similar tile group grid from parameter set (e.g., PPS) or picture header of the source bitstream.

Figure 14:
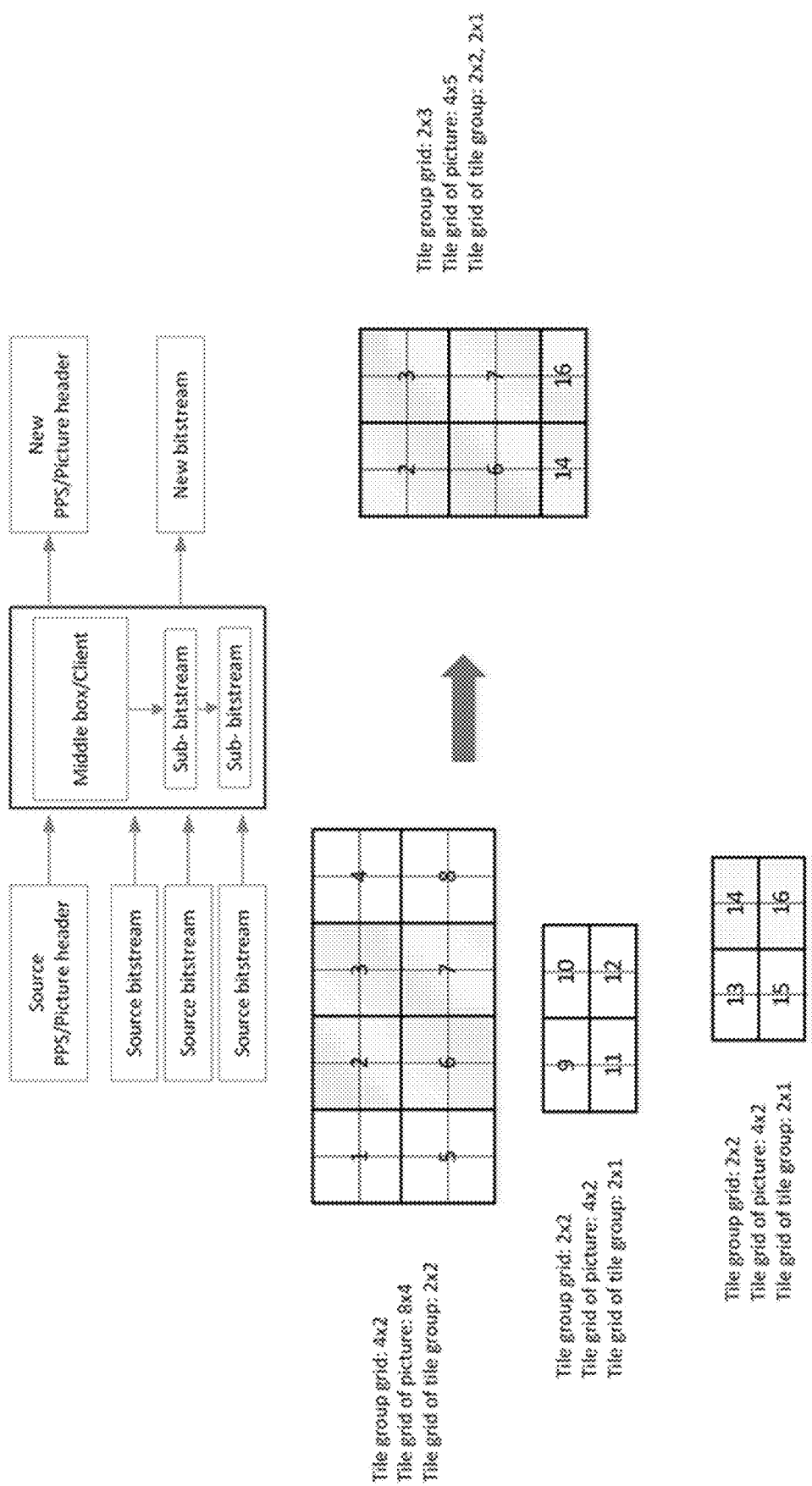
FIG. 14 illustrates example extraction and reposition of MCTS-based sub-picture tile groups.

FIG. 14 illustrates an example extraction and reposition of MCTS-based sub-picture tile groups of different resolutions. For multiple-resolution MCTS-based viewport-dependent scheme (e.g., as shown in FIG. 14), the tile group described herein may simplify the sub-bitstream extraction and reposition. For example, the tile group grid at PPS and tile group entry at picture header may be updated, and the corresponding MCTS based sub-picture tile group may be merged together, e.g., without rewriting the low level bitstream. FIG. 14 may illustrate an example where a tile group grid may be changed in a merged bitstream (e.g., new merged bitstream), while the low level tile group header and data may be intact during the extraction and merging. After parsing the parameter set (e.g., PPS), the middle box and/or the client may identify the tile group sub-bitstream #2, #3, #6, and #7 from the first stream and the tile group sub-bitstream #14 and #16 from the third bitstream. The middle box and/or the client may extract the corresponding tile group sub-bitstreams, e.g., based on the tile group entry point and may reposition the tile-group sub-bitstreams into a new stream. The middle box and/or the client may produce the new VPS, SPS, and/or PPS with updated tile group partitioning structure as illustrated in FIG. 14. As the local tile grid remains the same for a (e.g., each) tile group before and after extraction and reposition, and as local tile grid is signaled within a (e.g., each) tile group sub-bitstream, the extraction and reposition process may skip rewriting the tile group sub-bitstreams.

Figure 15A:
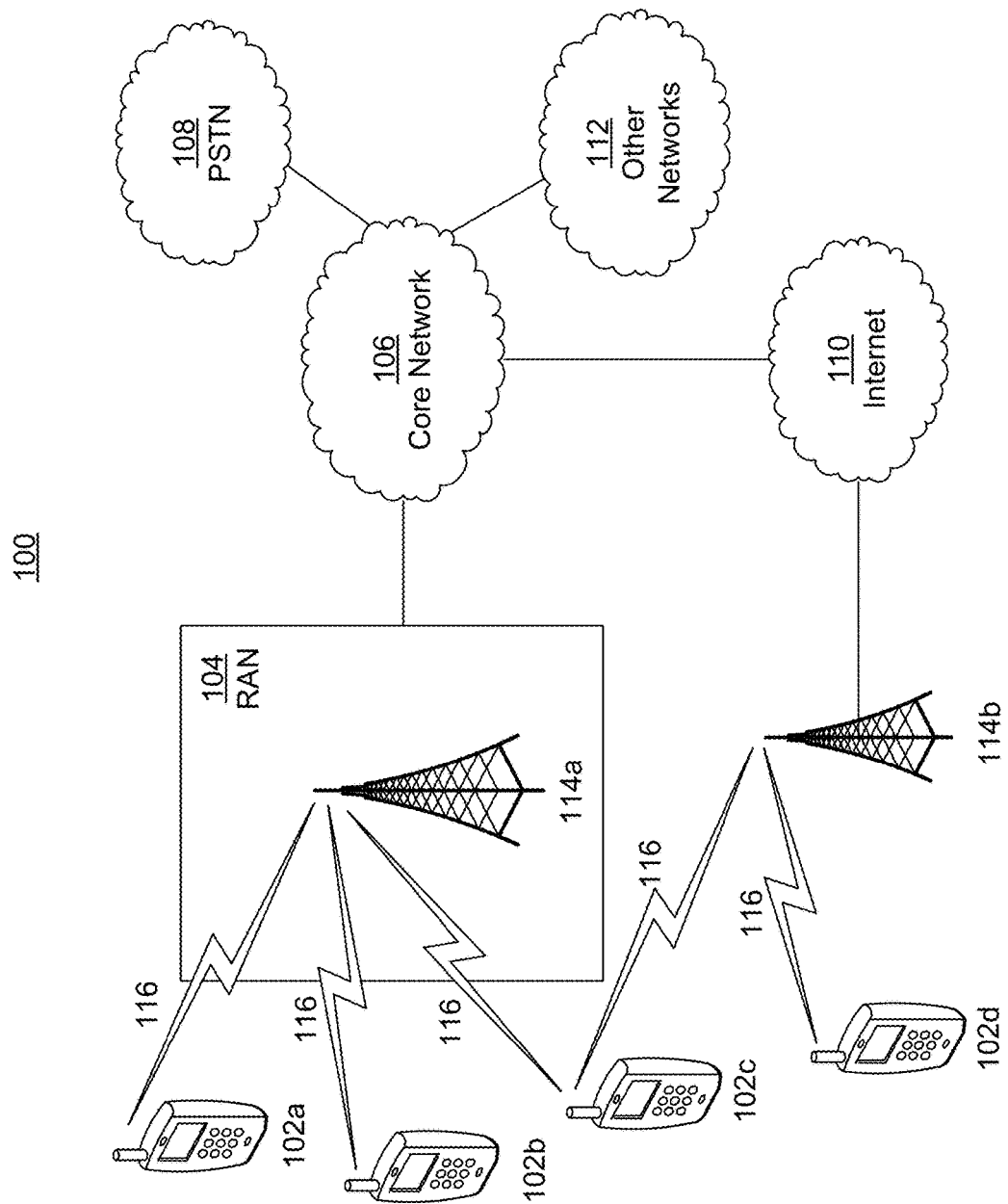
FIG. 15A is a system diagram illustrating an example communications system in which one or more disclosed embodiments may be implemented.

FIG. 15A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 15A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 15A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 15A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 15A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 15A may be configured to communicate with the base station 114a, which may employ a cellular-based radio technology, and with the base station 114b, which may employ an IEEE 802 radio technology.

Figure 15B:
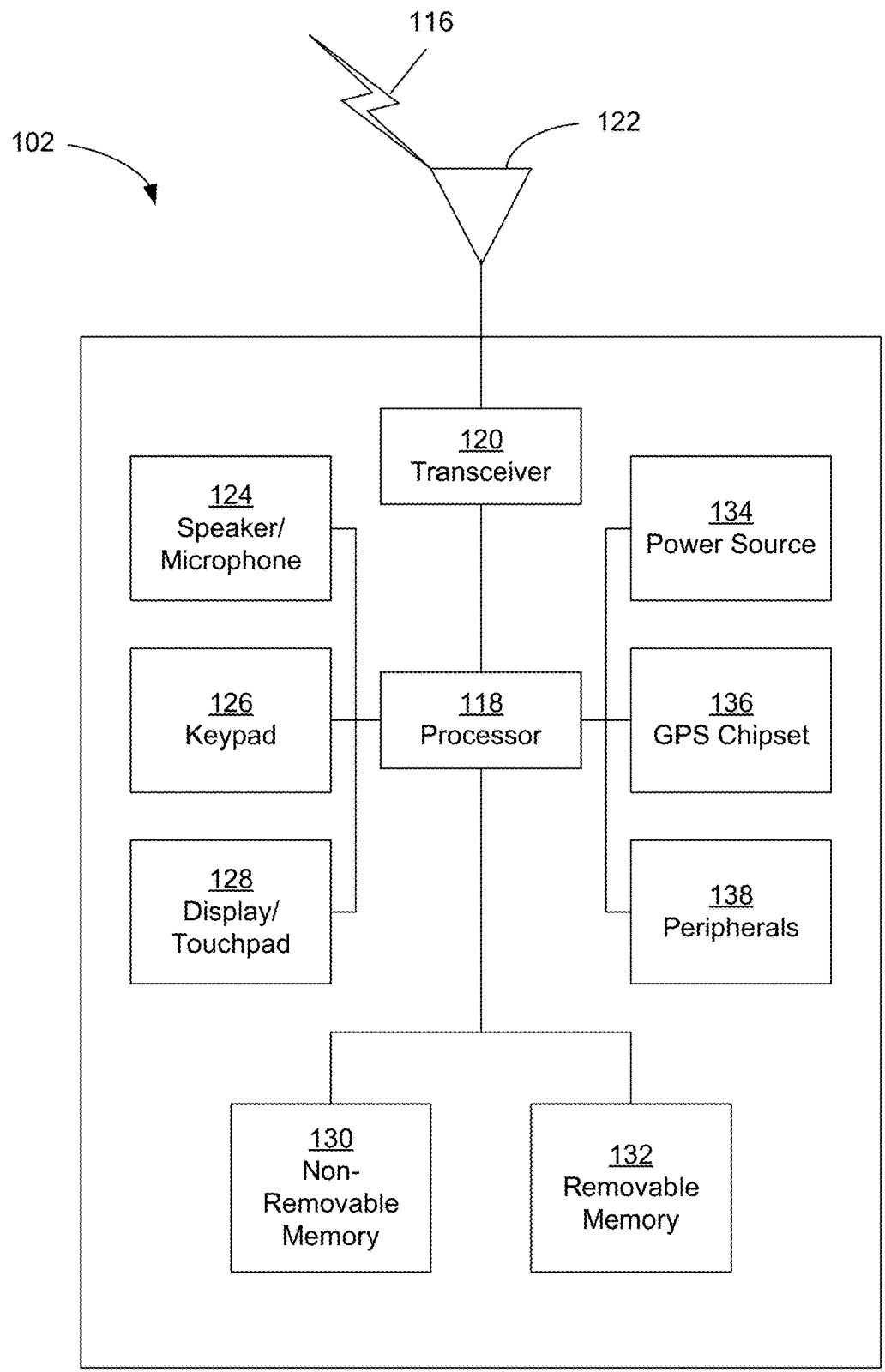
FIG. 15B is a system diagram illustrating an example wireless transmit/receive unit (WTRU) that may be used within the communications system illustrated in FIG. 15A according to an embodiment.

FIG. 15B is a system diagram illustrating an example WTRU 102. As shown in FIG. 15B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 15B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 15C:
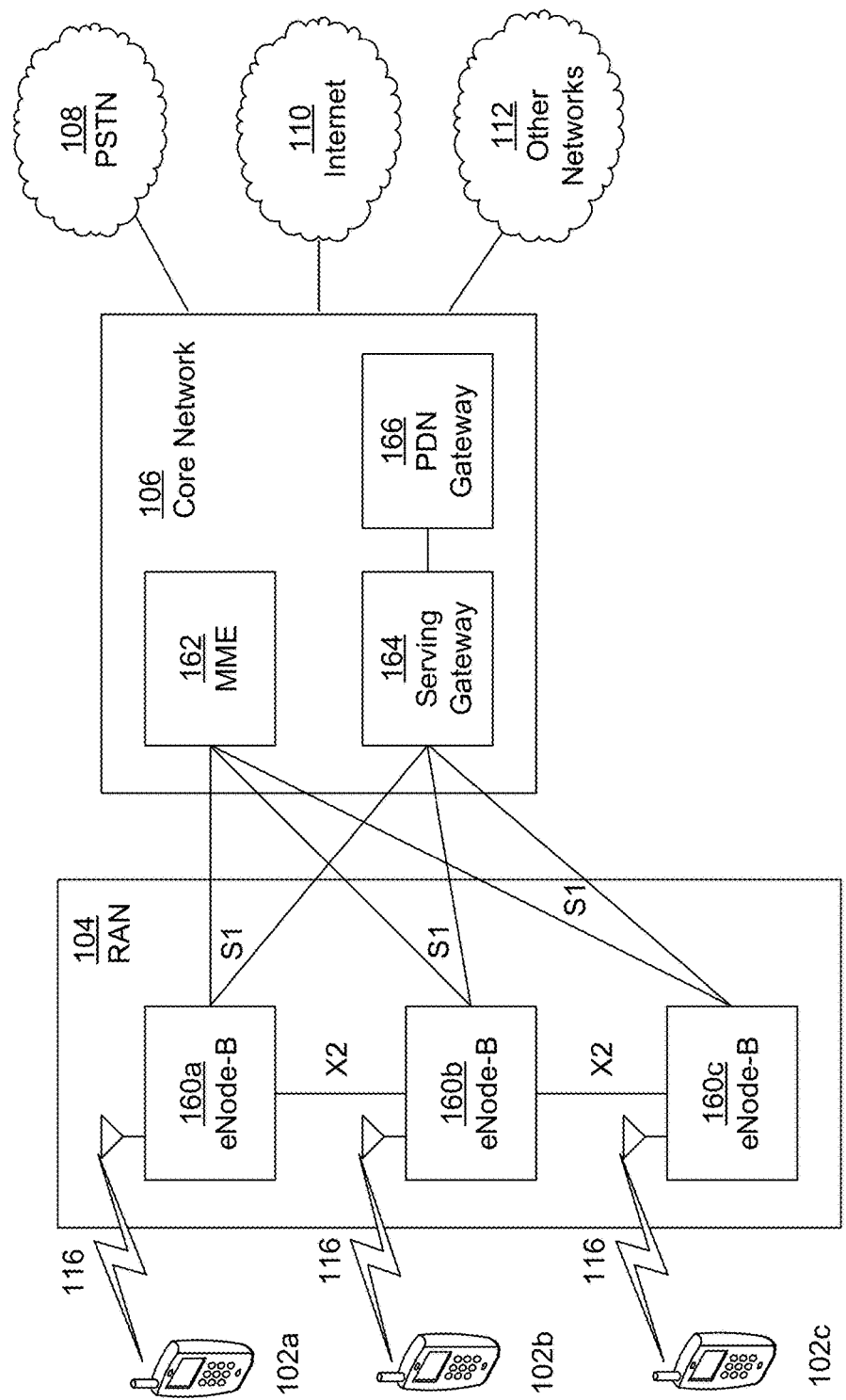
FIG. 15C is a system diagram illustrating an example radio access network (RAN) and an example core network (CN) that may be used within the communications system illustrated in FIG. 15A according to an embodiment.

FIG. 15C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 15C, the eNode-Bs 160a, 160b, 160c may communicate with one another over an X2 interface.

The CN 106 shown in FIG. 15C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 15A-15D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 15D:
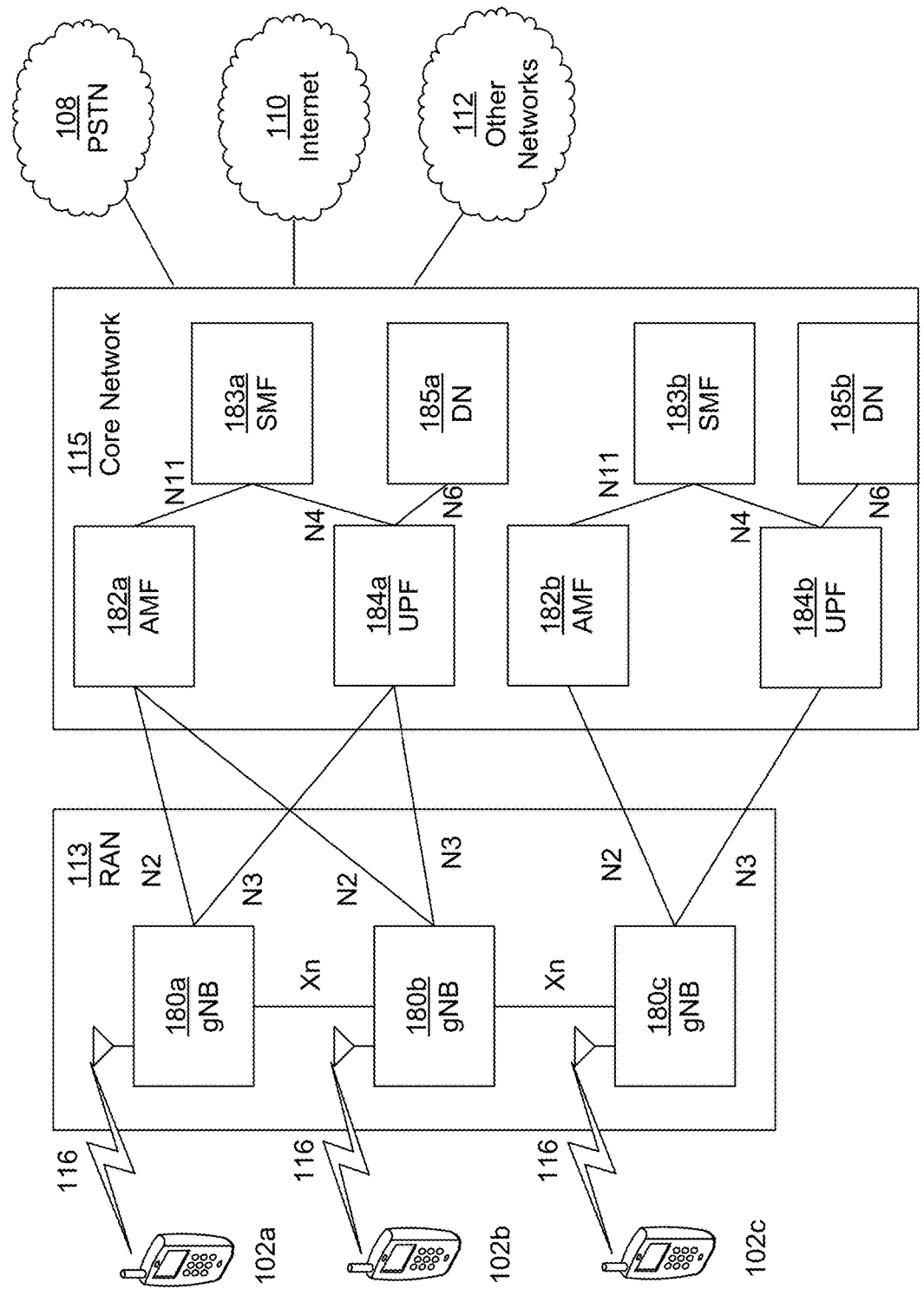
FIG. 15D is a system diagram illustrating a further example RAN and a further example CN that may be used within the communications system illustrated in FIG. 15A according to an embodiment.

FIG. 15D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 15D, the gNBs 180a, 180b, 180c may communicate with one another over an Xn interface.

The CN 115 shown in FIG. 15D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 15A-15D, and the corresponding description of FIGS. 15A-15D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Accordingly, systems and implementations have been described herein for defining a rectangular picture area in a video data stream and rendering corresponding pictures. A computing system which may be, for example, a wireless transmit and receive unit (WTRU) may be programmed to receive a video bitstream comprising a picture having a picture header. The received video bitstream may be, for example, Versatile Video Coding (VVC) formatted data. The computing system may identify, based on a picture parameter set identifier in the picture header, a picture parameter set (PPS) that comprises data specifying a structure of the picture.

The computing system may determine, based on data specifying the structure of the picture, an identifier corresponding to a defined rectangular area in the picture and a tile index of a top left tile in the defined rectangular area. For example, the computing system may parse the data specifying the structure of the picture for the identifier corresponding to the defined rectangular area and for the tile index of the top left tile. The computing system may determine one or more tiles comprised in the defined rectangular area based upon the identifier corresponding to the defined rectangular area and the tile index of the top left tile in the defined rectangular area.

The computing system may reconstruct the picture including a sub-picture that comprises the defined rectangular area based on the identifier corresponding to the defined rectangular area. The computing system may render the sub-picture in the defined rectangular area.

It will be appreciated that while illustrative implementations have been disclosed, the scope of potential implementations is not limited to those explicitly set out. For example, while systems have been described with reference to a particular terms such as CTUs, tiles, tile groups, etc., the envisioned embodiments extend beyond implementations using the particular terms described herein. Although the features and elements may be described herein in particular combinations, each feature or element may be used alone, without the other features and elements, and/or in various combinations with or without other features and elements.

It is understood that the entities performing the processes described herein may be logical entities that may be implemented in the form of software (i.e., computer-executable instructions) stored in a memory of, and executing on a processor of, a mobile device, network node or computer system. That is, the method(s) may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGS. may be performed by communication circuitry of the node under control of the processor of the node and the computer-executable instructions (e.g., software) that it executes.

The various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as flash drives, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing illustrative implementations of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Details described herein are intended to be exemplary and in no way limit the scope of the application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of video coding, comprising:
receiving a video bitstream comprising a picture and a picture parameter set;
identifying, from the picture parameter set, structure data regarding structure of the picture, wherein the structure data comprises an indication of a number of one or more rectangular areas, an identifier corresponding to each respective rectangular area, and an indication of tile index of a top left tile in the respective rectangular area, wherein the picture is partitioned with a tiles grid;
determining one or more tiles comprised in a defined rectangular area associated with the identifier and the tile index; and
reconstructing the picture having a sub-picture that comprises the defined rectangular area based on the identifier.

2. The method of claim 1, further comprising:
rendering the sub-picture in the defined rectangular area.

3. The method of claim 1, further comprising:
extracting, from the video bitstream, a sub-bitstream associated with the sub-picture based on the identifier; and
reconstructing the sub-picture based on the sub-bitstream.

4. The method of claim 1, further comprising:
parsing the picture parameter set to identify an identifier associated with the sub-picture;
identifying a sub-bitstream associated with the sub-picture based upon the identifier corresponding to the defined rectangular area matching the identifier associated with a sub-picture; and
reconstructing the sub-picture based on the sub-bitstream.

5. The method of claim 1, wherein the picture comprises a plurality of sub-pictures, the sub-picture being a first sub-picture, and the method further comprising:
determining, in the data regarding structure of the of picture in the picture parameter set, a second identifier corresponding to a second defined rectangular area;
identifying a second sub-bitstream associated with a second sub-picture based upon the second identifier corresponding to the second defined rectangular area; and
reconstructing the second sub-picture based on the second sub-bitstream, wherein the picture is reconstructed having the first sub-picture that comprises the first defined rectangular area and the second sub-picture that comprises the second defined rectangular area.

6. The method of claim 1, further comprising parsing the structure data for data related to the identifier.

7. The method of claim 1, wherein the bitstream comprises Versatile Video Coding (VVC) formatted data.

8. The method of claim 1, wherein the defined rectangular area is a region of interest.

9. The method of claim 1, wherein the bitstream comprises omnidirectional video data.

10. A computing system, comprising:
a computing processor; and
computing memory communicatively coupled with the computing processor, the computing memory comprising executable instructions that cause the computing system to perform operations comprising:
receiving a video bitstream comprising a picture and a picture parameter set;
identifying, from the picture parameter set, structure data regarding structure of the picture, wherein the structure data comprises an indication of a number of one or more rectangular areas, an identifier corresponding to each respective rectangular area, and an indication of tile index of a top left tile in the respective rectangular area, wherein the picture is partitioned with a tiles grid;
determining one or more tiles comprised in a defined rectangular area associated with the identifier and the tile index; and
reconstructing the picture having a sub-picture that comprises the defined rectangular area based on the identifier.

11. The computing system of claim 10, wherein the executable instructions cause the computing system to perform operations further comprising:
rendering the sub-picture in the defined rectangular area.

12. The computing system of claim 10, wherein the executable instructions cause the computing system to perform operations further comprising:
extracting, from the video bitstream, a sub-bitstream associated with the sub-picture based on the identifier; and
reconstructing the sub-picture based on the sub-bitstream.

13. The computing system of claim 10, wherein the executable instructions cause the computing system to perform operations further comprising:
parsing the picture parameter set to identify an identifier associated with the sub-picture;
identifying a sub-bitstream associated with the sub-picture based upon the identifier corresponding to the defined rectangular area matching the identifier associated with a sub-picture; and
reconstructing the sub-picture based on the sub-bitstream.

14. The computing system of claim 10, wherein the picture comprises a plurality of sub-pictures, the sub-picture being a first sub-picture, and wherein the executable instructions cause the computing system to perform operations further comprising:
determining, in the data regarding structure of the of picture in the picture parameter set, a second identifier corresponding to a second defined rectangular area;
identifying a second sub-bitstream associated with a second sub-picture based upon the second identifier corresponding to the second defined rectangular area; and
reconstructing the second sub-picture based on the second sub-bitstream, wherein the picture is reconstructed having the first sub-picture that comprises the first defined rectangular area and the second sub-picture that comprises the second defined rectangular area.

15. The computing system of claim 10, wherein the executable instructions cause the computing system to perform operations further comprising:
parsing the structure data.

16. The computing system of claim 10, wherein the executable instructions cause the computing system to perform operations further comprising:

extracting the sub-picture based upon the identifier.

17. The computing system of claim 10, wherein the bitstream comprises Versatile Video Coding (VVC) formatted data.

18. The computing system of claim 10, wherein the defined rectangular area is a region of interest.

19. The computing system of claim 10, wherein the bitstream comprises omnidirectional video data.

20. The computing system of claim 10, wherein the computing system is a wireless transmit and receive unit (WTRU).

* * * * *